US012212012B2

(12) United States Patent
Weis

(10) Patent No.: US 12,212,012 B2
(45) Date of Patent: Jan. 28, 2025

(54) BATTERY CELL MACROMODULE HOUSING, CONTACTING DEVICE FOR A BATTERY CELL MACROMODULE HOUSING, HOUSING COVER FOR A CONTACTING DEVICE FOR A BATTERY CELL MACROMODULE HOUSING AND A BATTERY CELL MACROMODULE

(71) Applicant: SCIO TECHNOLOGY GMBH, Aschaffenburg (DE)

(72) Inventor: Alexander Weis, Hösbach (DE)

(73) Assignee: SCIO TECHNOLOGY GMBH, Aschaffenburg (DE)

( * ) Notice: Subject to any disclaimer, the term of this patent is extended or adjusted under 35 U.S.C. 154(b) by 636 days.

(21) Appl. No.: 17/601,160

(22) PCT Filed: Apr. 5, 2019

(86) PCT No.: PCT/DE2019/100315
§ 371 (c)(1),
(2) Date: Oct. 4, 2021

(87) PCT Pub. No.: WO2020/200338
PCT Pub. Date: Oct. 8, 2020

(65) Prior Publication Data
US 2022/0181732 A1 Jun. 9, 2022

(51) Int. Cl.
*H01M 50/209* (2021.01)
*H01M 50/213* (2021.01)
(Continued)

(52) U.S. Cl.
CPC ....... *H01M 50/209* (2021.01); *H01M 50/213* (2021.01); *H01M 50/264* (2021.01);
(Continued)

(58) Field of Classification Search
None
See application file for complete search history.

(56) References Cited

U.S. PATENT DOCUMENTS

2012/0251873 A1* 10/2012 Miyawaki ........... H01M 50/209
429/178
2013/0207459 A1* 8/2013 Schroder ............. H01M 50/264
307/10.1
(Continued)

FOREIGN PATENT DOCUMENTS

CN 108389984 A 8/2018
DE 102008059960 A1 6/2010
(Continued)

OTHER PUBLICATIONS

International Search Report (in English and German) and Written Opinion of the ISA (in German) issued in PCT/DE2019/100315, mailed Apr. 30, 2020; ISA/EP.
(Continued)

*Primary Examiner* — Kevin M Bernatz
(74) *Attorney, Agent, or Firm* — Harness, Dickey & Pierce, P.L.C.

(57) ABSTRACT

A battery cell macromodule housing having a housing shell comprising two longitudinal walls and two end walls, the longitudinal walls being arranged perpendicular to the end walls, and the longitudinal walls and the end walls each being parallel to and spaced apart from each other so that the walls annularly enclose the interior space. The housing shell further has a plurality of positioning indentations formed on the inner sides of the walls, respectively, for positioning a battery cell perpendicular to the passage plane enclosed by the walls. The positioning indentations in the end walls are spaced further apart than the positioning indentations in the longitudinal walls.

39 Claims, 12 Drawing Sheets

Figure 1A:
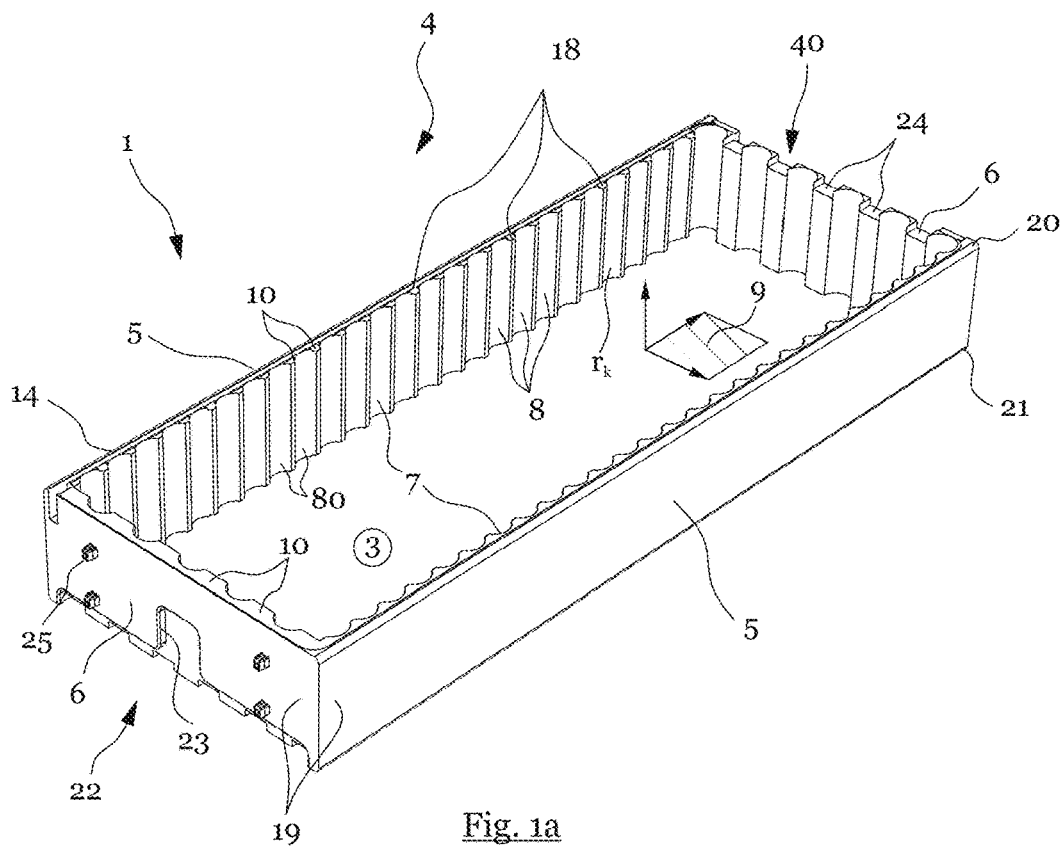

(51) Int. Cl.
*H01M 50/264* (2021.01)
*H01M 50/271* (2021.01)
*H01M 50/284* (2021.01)
*H01M 50/516* (2021.01)
*H01M 50/566* (2021.01)

(52) U.S. Cl.
CPC ....... *H01M 50/271* (2021.01); *H01M 50/284* (2021.01); *H01M 50/516* (2021.01); *H01M 50/566* (2021.01); *H01M 2220/20* (2013.01)

(56) References Cited

U.S. PATENT DOCUMENTS

| | | | | |
|---|---|---|---|---|
| 2015/0017504 | A1* | 1/2015 | Isshiki | B60L 53/65 |
| | | | | 429/120 |
| 2015/0072199 | A1 | 3/2015 | Schmidt et al. | |
| 2018/0108878 | A1* | 4/2018 | Fees | H01M 50/147 |
| 2018/0205045 | A1* | 7/2018 | Schröder | H01M 50/264 |
| 2019/0198842 | A1* | 6/2019 | Takada | H01M 50/50 |
| 2019/0296407 | A1* | 9/2019 | Newman | H01M 10/6555 |
| 2019/0379011 | A1* | 12/2019 | Park | H01M 50/3425 |
| 2020/0013821 | A1* | 1/2020 | Oota | G02B 5/201 |
| 2020/0067045 | A1* | 2/2020 | Takano | H01M 50/342 |
| 2020/0127255 | A1* | 4/2020 | Moon | H01M 10/6568 |
| 2020/0152954 | A1* | 5/2020 | Monismith | H01M 50/579 |
| 2020/0266506 | A1* | 8/2020 | Stuetz | H01M 10/6568 |
| 2021/0143383 | A1* | 5/2021 | Czech | H01M 50/358 |
| 2021/0151825 | A1* | 5/2021 | Chen | H01M 50/179 |
| 2021/0257700 | A1* | 8/2021 | Wu | H01M 50/3425 |
| 2021/0273283 | A1* | 9/2021 | Dittmann | H01M 50/264 |
| 2021/0328310 | A1* | 10/2021 | Motokawa | H01M 50/55 |
| 2022/0021074 | A1* | 1/2022 | Mabrey | H01M 50/358 |

FOREIGN PATENT DOCUMENTS

| | | |
|---|---|---|
| DE | 102013109808 A1 | 3/2015 |
| DE | 102016113177 A1 | 1/2018 |
| WO | WO-2011033727 A1 | 3/2011 |
| WO | 2018071850 A1 | 4/2018 |
| WO | WO-2020182953 A1 * | 9/2020 ............... A62C 3/16 |

OTHER PUBLICATIONS

German International Preliminary Report on Patentability issued in PCT/DE2019/100315, dated Mar. 15, 2021.

* cited by examiner

BATTERY CELL MACROMODULE HOUSING, CONTACTING DEVICE FOR A BATTERY CELL MACROMODULE HOUSING, HOUSING COVER FOR A CONTACTING DEVICE FOR A BATTERY CELL MACROMODULE HOUSING AND A BATTERY CELL MACROMODULE

CROSS-REFERENCE TO RELATED APPLICATIONS

This application is a U.S. National Phase Application under 35 U.S.C. 371 of International Application No. PCT/DE2019/100315, filed on Apr. 5, 2019. The entire disclosure of the above application is incorporated herein by reference.

BACKGROUND

This section provides background information related to the present disclosure which is not necessarily prior art.

TECHNICAL FIELD

The present invention relates to a battery cell macromodule housing for accommodating a plurality of cylindrical battery cells in an interior space of the battery cell macromodule housing, in particular for use in electrically powered vehicles, for example electric scooters, electric cars, electric trucks, electric utility vehicles, electric boats or the like, or also for storage systems. Furthermore, the invention relates to a contacting device for a battery cell macromodule housing, a housing cover for a contacting device for a battery cell macromodule housing, and a battery cell macromodule. The battery cell macromodule housing has a housing shell that includes two longitudinal walls and two end walls, the longitudinal walls being arranged perpendicular to the end walls, and the longitudinal walls and the end walls each opposing each other in parallel spaced-apart relation so that the walls annularly surround the interior space. The housing shell further comprises a plurality of positioning indentations, each formed on the inner sides of the walls for positioning a battery cell perpendicular to the passage plane enclosed by the walls, wherein the inner sides of the walls each have separating elements which are arranged between adjacent positioning indentations and project into the interior space, wherein the longitudinal walls are longer than the end walls and the positioning indentations in the end walls are spaced apart from one another by a greater distance than the positioning indentations in the longitudinal walls, wherein the battery cell macromodule housing is closed with a cover on the upper side and/or the lower side of the housing shell, wherein the cover has two superimposed plates, of which an outer plate is made of a material with high thermal conductivity and of which an inner plate is made of an electrically non-conductive material, at least one of the plates in each case having a plurality of pre-stamped predetermined breaking surfaces which are in each case arranged essentially in alignment with the longitudinal axes with the battery cells which can be accommodated in the housing, so that, in the event of outgassing of one or more of the battery cells, escaping hot gases can knock the predetermined breaking surfaces out of the plates. A battery cell macromodule housing is known, for example, from DE 10 2008 059 960 A1. Further battery cell macromodule housings are also known from DE 10 2016 113 117 A1 or WO 2011/033727 A1. A contacting device for a battery cell macromodule housing is known from CN 108 389 984 A.

DISCUSSION

One problem with battery cell modules is that the modules heat up strongly during operation, especially under high load, and expand as a result. These temperature-dependent changes in volume, particularly in relation to the outer circumference of the battery cells, mean that the individual battery cells cannot be arranged next to each other in direct contact. Due to the resulting pressure, there is a risk that the battery cells, or the infrastructure surrounding the battery cells, or the entire battery cell module will be destroyed. Therefore, it is necessary to maintain a predetermined distance between the battery cells during the production of battery cell modules, which is based on the expected thermal expansion of the individual battery cells. At the same time, due to performance requirements or increasing demand for energy storage capacity on the one hand and the limited space available in electrically powered vehicles on the other, it is necessary to accommodate as many cells as possible in a small space. Furthermore, it is a constant goal of further developments in the vehicle sector to save material and weight in order to reduce costs and increase energy efficiency.

The disadvantage here is that additional elements are required to separate the battery cells from one another both for the manufacture of the battery modules, in particular for the positioning of the battery cells, and for the spatial separation of the battery cells from one another, which make the modules unnecessarily complex and lead to increased manufacturing costs and at the same time have a negative effect on the possible packing density of the battery cells.

SUMMARY

This section provides a general summary of the disclosure, and is not a comprehensive disclosure of its full scope or all of its features.

It is therefore one aspect of the technical problem of the invention to overcome the disadvantages of the prior art, and in particular of improving a battery cell macromodule housing for use in an electrically operated vehicle to the extent that it can avoid stresses due to thermal expansions with a particularly compact and material-saving design.

Preferably, the housing shell may have a height substantially equal to the height of the battery cells to be accommodated.

The separating elements may in particular be ribs which extend from the upper side of the housing towards the lower side of the housing or vice versa perpendicularly to the passage plane along the walls, at least in sections. In this case, the separating elements extend in particular between the adjacent profiles of the positioning indentations and have a thickness on the housing interior side which determines the spacing between adjacent positioning indentations. In particular, the separating elements can project into the interior space to the same extent as the outer sides of the positioning indentations. Preferably, the separating elements project further into the interior space at the end walls than at the longitudinal walls. However, the separating elements may also project equally far into the interior space on the longitudinal side and on the front side. The positioning indentations in the longitudinal walls preferably all have the same depth. The positioning indentations in the end walls preferably also have the same depth. The depth of the positioning indentations of the end walls and that of the longitudinal walls may differ, preferably the depth of the end positioning indentations is greater than that of the longitudinal walls.

It can be provided that the longitudinal walls each have the same even number of positioning indentations and the end walls each have a number of positioning indentations differing by the value one. The even number of positioning indentations in the longitudinal walls results from the fact that the micromodules to be inserted into the housing are each formed in the longitudinal direction from a battery cell pair, which in each case comprises two battery cells lying next to one another. The difference of one positioning indentation between the two end walls results from the fact that an odd number of battery cells in the end direction, i.e. an odd number of battery cell pairs, can be produced particularly well. Along the longitudinal walls, battery cells can be in contact with the housing shell only at the positioning indentations. Along the end walls, battery cells can be in contact with the housing shell both with the positioning indentations and with the separating elements located between the positioning indentations. This follows in particular from the special arrangement of the battery cells, which is predetermined by the geometry of the housing shell. In this case, the micromodules which can be accommodated in the housing shell each comprise a plurality of pairs of battery cells which extend in a zigzag pattern offset from one another in the end-face direction. This arrangement ensures that the longitudinal axes of all directly adjacent cylindrical battery cells, which all have the same cell diameter, have the same spacing in each case. Adjacent battery cells thus form the outer edges of equilateral triangles. From the offset of the battery cell pairs with respect to one another, it follows that the outer battery cells of the battery cell pairs of the micromodules which are closer to the end face of the housing wall are each accommodated in a positioning recess. In contrast, the outer battery cells of the battery cell pairs of the micromodules which are further away from the front housing wall and which are in contact with the front housing wall are each in contact with a separating element between two positioning indentations.

Furthermore, one of the end walls may preferably have at least three positioning indentations and the other end wall may have at least four, particularly preferably five or six positioning indentations. In the case of three or more battery cells bearing against a wall, the consequence for the battery cell module is that not all battery cells bear against the wall and can be positioned or at least partially fixed via a positioning indentation or a separating element, but instead battery cells are additionally accommodated in the interior space enclosed by the housing walls, which battery cells are in each case surrounded only by further adjacent battery cells and accordingly have to be supported by the latter in order to implement the distance to be maintained between the battery cell outer sides. In the present battery cell module, due to the formation of the micromodules by battery cell pairs, the total number of battery cells can only be an even number.

In particular, the spacing of the positioning indentations in the end walls may be greater than the spacing of the positioning indentations in the longitudinal walls by a factor of $2/\sqrt{3}$. The positioning indentations in the longitudinal side walls may each have a distance from one another which is greater than the outer diameters of the battery cells. This distance is in particular the battery cell diameter plus a safety value, in which an expansion of the cells during operation due to the effect of temperature as well as an expansion of the cells over their operating time is taken into account, furthermore a tolerance coefficient. Since all the battery cells accommodated in the module have the same distance from adjacent cells and the longitudinal axes of the cells thus form the outer edges of equilateral triangles, it follows for the distance between the positioning indentations on the end walls that this corresponds to the distance between two pairs of battery cells between which a pair of battery cells is arranged which is offset with respect thereto and which consequently does not rest against a positioning indentation but against the separating element located in between. The distance between two adjacent battery cells in the front direction is equal to the distance between two battery cells in the longitudinal direction divided by $\sqrt{3}$. Thus, the distance between two front positioning indentations is equal to the distance between two battery cells in the longitudinal direction multiplied by $2/\sqrt{3}$.

Further, the positioning indentations may include half-shells having a radius of curvature equal to the radius of curvature of the cylindrical battery cells, the distance between the longitudinal half-shells being greater than twice the radius of curvature.

The plates of the cover covering the housing shell may be glued or screwed to each other. The plates may be bonded or screwed to the housing. For this purpose, the housing shell may have blind holes on the upper side of the housing and on the lower side of the housing, which are made in the circumferential edge. The outer plate serves both to mechanically stabilize the module and the micromodules accommodated in the housing and to effectively dissipate heat. The plate on the inside of the module is designed as a so-called gap filler, which consists of an electrically non-conductive material. This ensures that the module exterior is electrically shielded from the module interior. Preferably, the inner plate also has a high thermal conductivity in order to effectively dissipate heat from the module interior to the outside.

In particular, the predetermined breaking surfaces may be circular in shape in accordance with the battery cell shape. The pre-embossing may provide that the predetermined breaking surfaces are regions of reduced material thickness. Alternatively, the pre-embossing may provide that the predetermined breaking surfaces are each enclosed by perforation seams.

In particular, the diameters of the predetermined rupture surfaces may be smaller than the outer diameters of the battery cells. It is important that the diameter of the outgassing vents is smaller than the outer diameter of the cells, but larger than the outgassing cap of the cell, in order to promote the opening of the cell and the escape of the hot gases.

In addition, one of the longitudinal walls can have a longitudinal groove in the longitudinal direction on the upper or lower side of the housing for receiving a printed circuit board, wherein, starting from the longitudinal groove, a plurality of through-openings spaced apart from one another extend through the longitudinal wall parallel to the positioning indentations, in each case in alignment with one of the inner-side separating elements. The longitudinal groove is preferably open towards the upper side or lower side of the housing in each case, so that a printed circuit board can be inserted into the groove from the corresponding direction, i.e. perpendicular to the passage plane. The longitudinal groove can preferably extend almost through the entire longitudinal wall and extend at least between the outer separating elements. Preferably, the longitudinal groove has a height between a quarter and a third of the height of the housing shell. The through openings may extend through the entire housing shell. Preferably, the number of through openings in the corresponding longitudinal wall may be seven. In particular, it may be provided that a through opening is arranged at the height of every fourth separating element. Preferably, a tap is made at every second pair of battery cells. Preferably, the outermost pairs of battery cells each have an intermediate tap.

The longitudinal groove can open into one of the end walls and have a recess in the mouth area to accommodate a PCB connection socket. In particular, the recess can be cuboid-shaped and have a sufficient size to accommodate a 12-pole PCB connection socket. Like the longitudinal groove, the recess is preferably open towards the upper or lower side of the housing, so that the printed circuit board together with the connection socket can be inserted into the longitudinal groove and the recess.

The separating elements, to which one of the through-openings is assigned in an aligned manner, can furthermore each have grooves running perpendicularly to the longitudinal wall plane on the upper side and lower side of the housing, a first of the grooves opening into the longitudinal groove and a second of the grooves opening into the assigned through-opening in each case. The grooves are each open towards the upper side and the lower side of the housing, respectively. The width of the grooves depends on the width of the separating elements, the grooves being no wider than the end piece of the separating elements projecting into the interior space. The grooves each have a depth such that an intermediate tap guided through the groove meets a contact plate in such a way that it can be fixed thereon.

The battery cell macromodule housing may further comprise a circuit board disposed in the longitudinal groove and having a plurality of arms extending respectively through the through-holes and electrically connected to the circuit board. The circuit board preferably has a board body corresponding to the dimensions of the longitudinal groove, and accordingly extending mainly in the direction of the longitudinal groove. Preferably, the arms extend away from the board body at regular intervals perpendicular to the main direction of extension. In this regard, the circuit board may further comprise intermediate taps bent on the upper side of the housing and the arms bent on the lower side of the housing, which taps extend through grooves extending perpendicularly to the longitudinal wall plane and are respectively in contact with electrical connection elements between two battery cells adjacent to the grooves.

In particular, the intermediate taps may be welded or soldered to the electrical connection elements. The electrical connection elements can in particular be contact plates which respectively connect the two battery cells of a pair of battery cells. The contact plates respectively connect the negative terminals and respectively the positive terminals of both battery cells and are preferably attached to the cells in a centered manner on the cells. The intermediate taps are preferably made centrally between the battery cells on the respective contact plate.

To monitor battery cell module parameters, the intermediate taps may each include at least one sensor for sensing temperature values and cell voltages. The intermediate taps can be formed from sheet metal sections.

In addition, the circuit board may have a female connector attached to the circuit board and received in the end face recess. The female connector is correspondingly attached to an outer portion of the board body such that the female connector body protrudes beyond the board end in the main extension direction of the board.

One of the end walls may have a recess forming a step on the outside of the upper side of the housing, and the other of the end walls may have a recess forming a step on the outside of the lower side of the housing. As a result, both end faces of the housing shell have a recess rotated 180 degrees relative to each other. In addition, all further housing elements arranged on the end faces can likewise be correspondingly arranged at 180 degrees to one another on the respective end faces, such as, for example, the longitudinal groove together with the recess. The recess is characterized by a step-shaped wall with respect to a plane end wall, when the cross-section of the end wall is considered. As a result, the end walls may each have an edge extending over substantially the entire width of the wall. The edge may extend through the respective wall with varying depth relative to the top of the housing and the bottom of the housing, respectively. The profile of the recess is in particular T-shaped in plan view. The recess can extend into the wall thickness with a step depth of 1 mm to 1 cm.

In this case, the recess may extend over a first width of the end wall with a first depth as seen from the top or bottom of the housing, the first width corresponding to the number of separating elements on the inside of the end wall, wherein the recess may have a section with increased depth in a central region of the wall, the width of which section corresponds substantially to the dimension of the increased depth. Thus, the recess may have a T-shaped profile with two lateral arms extending along the respective housing side and a central central region extending deeper into the housing height, the profile being open towards the respective housing side depending on which side the arms face. In particular, the central region may be square and have a width of 0.5 to 5 cm, wherein the difference between the increased depth and the first depth may correspond to the width of the central region. The recess may taper towards the respective housing side at the outer sides of the arms of the T-section.

The separating elements adjacent to the recess can each have recesses open towards the upper side of the housing or towards the lower side of the housing, which each run perpendicular to the end wall planes. The recesses may have a maximum width corresponding to that of the associated separating elements. In particular, the recesses can extend through the entire wall thickness, i.e. between the housing interior and the housing exterior.

Furthermore, the recesses may have a rectangular shape in cross-section through the end walls so that a crenellated structure is formed in the top view of each wall.

In particular, a plurality of latching elements may be arranged on the outer sides of each of the end walls. In this case, each latching element can comprise two latching hooks which each have a spacer section extending away from the end wall and a latching section extending parallel to the end wall, the latching section extending away from the spacer section at the end of the spacer section remote from the wall. The latching sections may be arranged parallel to each other. The latching portions may in particular face away from each other. The latching elements may in particular be arranged symmetrically on the respective end wall. In particular, a plurality of latching elements may be arranged one below the other in each case. Preferably, each end wall may comprise four latching elements.

The invention also relates to a contacting device for a battery cell macromodule housing as described above, which can be designed to supply voltage to the battery cells which can be accommodated in the housing, having a power plug which provides an electrical line between the housing interior and the housing exterior, and having a plug sleeve which is electrically and mechanically connected to the power plug, and having a power plug which can be detachably plugged into the plug sleeve, wherein the plug sleeve has a plurality of plug-in openings which allow the power plug to be plugged in from a plurality of different directions parallel to the end wall plane. The contacting devices may be fixed to the housing shell at the end walls. In particular, the contacting device may be inserted into the recess and fixed to a micromodule received in the housing shell via a connecting element. The plug sleeve may be welded, soldered or integrally formed with the power plug. In particular, the contacting device may be at least partially a pre-assembled part in which the power plug and the plug sleeve are provided in an already connected state.

The power plug can have a contact rail aligned parallel to the end wall, which has a width corresponding to the number of separating elements on the inside of the associated end wall. In this regard, a contact tab may adjoin the contact rail. In addition, contact fingers bent at right angles can extend away from the contact rail in the direction of the interior of the housing. The width of the contact rail is substantially the same as the first width of the recess, that is, the upper beam of the T-shaped profile. Since a contact finger is guided in the direction of the housing interior through each recess of each of the separating elements for connection to the connecting element in contact with the micromodule abutting the end wall, the width of the contact rail correlates with the number of separating elements or with the number of battery cells abutting the end wall. The contact rail can have an edge section which is bent over the full width of the contact rail and from which the contact fingers extend at regular intervals. The contact fingers may also be bent directly from the contact rail. In particular, the contact tab can extend centrally away from the contact rail, the contact tab having a smaller width than the contact rail. The contact bar may lie in the same plane as the contact rail. The contact tab may have a square surface or a rectangular surface. The contact tab may have dimensions substantially the same as those of the region of increased depth of the recess. Thus, at least the contact rail as well as the contact tab may be fully received within the recess. The rectangular surface may be electrically conductively and mechanically connected to the rear surface of the plug sleeve.

In particular, the power plug may be inserted in the recessed portion with the contact bar inserted in the first width portion, with the contact tab extending into the increased depth portion, and with the contact fingers extending through the recesses into the interior of the housing.

Furthermore, the power plug may comprise a melting fuse which is arranged between the contact lug and the contact rail and is formed by a predefined number of webs each having a predefined width. The melting fuse may be arranged in the connection region between the contact rail and the contact tab, in particular at the upper end of the contact tab. The melting fuse may extend over the entire width of the contact tab. In particular, the melting fuse may be formed from a plurality of webs and a plurality of free spaces between the webs. The overload current can be adjusted in particular by the number of webs, the web width, the width of the contact lug or the thickness of the metal sheet of the power plug. The melting fuse may in particular be arranged above the plug sleeve connected to the power plug, so that the melting fuse remains visible from the outside. The webs of the fusible link may in particular extend perpendicularly, i.e. at right angles, to the contact bar.

The plug sleeve may be formed from a flat tubular section in which two parallel wall sections are connected by means of connecting sections that are shorter than the parallel wall sections. The connecting sections may extend perpendicular to the parallel wall sections. However, the connecting sections may also extend in an arcuate manner. In particular, the mating apertures may extend parallel to the parallel wall sections. The plug-in openings may all have the same opening cross-section. For this purpose, the plug-in sleeve may have a larger dimension in the longitudinal direction of the pipe than in the transverse direction of the pipe.

In particular, the plug sleeve may have four openings, each of which is arranged at right angles to one another.

Further, the plug sleeve may include a sleeve aperture spaced from the front housing wall into which the power plug may resiliently engage. The sleeve aperture may be disposed in one of the parallel walls. The sleeve aperture may have a square cross-section. The square cross-section may have rounded corners.

Furthermore, the detachable power plug may comprise a connector element having two plug plates extending parallel to each other, which are resiliently movable relative to each other and are connected to each other via a retaining portion. In this regard, one of the plug plates may have a clip aperture through which a clip portion of a clip received between the plug plates projects, the clip having a circumferential edge which engages behind the clip aperture so that the clip is prevented from slipping out through the clip aperture. The distance between the mating plates in the untensioned state may be less than the thickness of the clip to prevent the clip from falling out.

In particular, the dimensions of the sleeve aperture and clip portion may be matched such that when the power plug is inserted into the plug sleeve, the clip engages the sleeve aperture.

In addition, the upper side of the clip projecting through the sleeve aperture may have a coloured marking. This makes it possible to see from the outside during operation of the battery cell macromodule whether the power plug is correctly inserted into the plug sleeve and thus to check whether the battery cell macromodule is contacted.

The contacting device may be mechanically and electrically couplable to battery cells received in the housing by the contact fingers of the power plug, wherein the plug sleeve may be mechanically and electrically coupled to the contact tab. In particular, the contact fingers may protrude through the castellated structure formed on the housing shell, which is formed by the recesses and the positioning indentations. In this regard, the contact fingers may in particular be coupled to a contact connector adapted to the power plug connection, which contact connector may be arranged in each of the front edge regions of the battery cell module for coupling to the contact fingers. This contact connector may have a zigzag-shaped central web extending in accordance with the battery cell offset, which extends parallel to the end walls. Contact elements may extend parallel to the end walls, each connecting a battery cell to one of the contact fingers. The end regions of the contact elements are designed in such a way that they have a straight course on the wall side in the end-face direction corresponding to the course of the contact fingers and a zigzag course on the battery cell side following the battery cell arrangement.

The invention further relates to a housing cover for a contacting device as described above for frontal attachment to the housing, which may be attachable to the housing shell for covering one or more of the frontal walls, wherein the housing cover may comprise a cover plate engageable with the frontal wall of the housing and having a through opening with an outer diameter corresponding to the plug sleeve dimensions, so that the plug sleeve projects through the through opening when the housing cover is attached. The cover plate may have dimensions corresponding at least to the dimensions of the end walls. In particular, the housing cover may be made of a non-conductive material to electrically shield the interior of the housing.

Furthermore, the housing cover may comprise a roof structure which is spaced apart from the cover plate, covers the plug-in sleeve on the outside and has roof openings corresponding to the openings in the plug-in sleeve, through which the power plug can be inserted into the plug-in sleeve. In particular, the roof structure may extend parallel to the cover plate. The distance between the roof structure and the cover plate may be dimensioned such that it is at least equal to the height of the plug sleeve. The roof structure can be dimensioned such that the plug-in sleeve is covered and, in addition, a sufficient distance remains at each of the roof openings from the plug-in sleeve arranged under the roof structure, in order to ensure sufficient protection from the electrically conductive parts of the battery cell module.

The roof structure may have a through hole through which the coloured marking of the clip is visible when the power plug is correctly inserted. The hole may be located centrally in the roof structure. The hole may be of a size that allows the underlying clip to be observed but at the same time prevents it from coming into contact therewith, i.e. a maximum of half a finger thickness. The hole may be used to release the clipped connection by using a pointed object inserted through the through hole to push the clip into the plug sleeve in the direction of the front housing wall, allowing the power plug to be pulled out.

A viewing window may also be arranged in the cover plate, aligned with the melting fuse covered by the cover plate, so that the condition of the melting fuse can be checked from the outside of the housing. The viewing window may be formed of at least one slot-shaped aperture, preferably several, to improve the visibility of the melting fuse. The slots may have widths corresponding to the roof bore, which allow the underlying melting fuse to be observed while preventing it from coming into contact therewith. The slot-shaped apertures may be provided horizontally in the cover plate. In particular, the slot-shaped apertures may have an angular offset from the lands of the underlying melting fuse, preferably an angular offset of 90 degrees so that all of the lands of the melting fuse are visible through the slot-shaped apertures. For this purpose, the slot-shaped openings may in particular have a greater width than the melting fuse.

The cover plate may have an aperture which is aligned with the recess arranged in the end wall for receiving a board connection socket. In particular, the aperture may correspond to or be larger than the dimensions of the plug sleeve.

The housing cover may further comprise stiffening ribs, which are each arranged on the cover plate, but do not extend in regions of the cover plate extending perpendicularly to the aperture or in the region of the insertion axes of the power plug. The stiffening ribs are also not arranged in the movement axes of the insertion directions of the power plug. Accordingly, the cover plate does not have stiffening ribs in the axes of the insertion openings of the roof structure. The width of the regions free of stiffening ribs is thereby greater than the width of the power plug. The purpose of leaving the regions of the top plate extending perpendicularly to the aperture free is to allow a cable to be passed along in these regions, which cable can be plugged into the circuit board connection socket. The stiffening ribs may serve as supporting elements which fix the roof structure to the cover plate. For this purpose, the stiffening ribs may be arranged in particular horizontally on the cover plate. A respective stiffening rib may extend horizontally from a respective corner of the roof structure, so that the cover plate has at least four stiffening ribs.

The cover plate may have one or more latching apertures corresponding to the latching elements, wherein when the housing cover is fixed to the housing shell, the latching elements protrude through the latching apertures and retain the housing cover by means of the latching portions abutting the outside of the housing cover. The latching apertures may have a width greater than the width of the latching portions, to allow the latching portions to extend therethrough. To release the latching elements, the latching sections facing away from each other and engaged behind the cover plate can be pressed together so that the cover plate can be removed.

The housing cover may further include an angled portion located on the side of the cover plate facing the slot-shaped apertures. The beveled portion extends away from the top edge of the cover plate toward the interior of the housing, and extends deeper into the interior of the housing than the underlying contact fingers of the power plug. The purpose of the folded section is to shield the contact fingers from the outside of the housing to prevent accidental contact with them. The bend can extend over almost the entire width of the cover, leaving free spaces in the corner areas of the cover plate, which can be used to fix the plates to the housing shell.

The invention further relates to a battery cell macromodule comprising a plurality of battery cell micromodules which may be accommodated in a battery cell macromodule housing as described above, wherein each battery cell micromodule may be formed of a plurality of cylindrical battery cells aligned parallel to each other, which are fixed at a predefined distance from each other and electrically contacted by a connecting plate welded to the upper sides and to the lower sides of the cells, respectively.

In this regard, each battery cell micromodule may comprise a plurality of battery cell pairs each having two battery cells arranged in parallel side by side, wherein the battery cell pairs may be arranged in a row extending parallel to the end walls in a zigzag manner in pairs offset from each other so that all immediately adjacent battery cells of a battery cell micromodule have substantially the same distance from each other.

In particular, the battery cell micromodules may be arranged in parallel side by side in the housing shell and the external battery cells may each abut one of the positioning indentations of the end walls or the longitudinal walls.

Preferably, the battery cell micromodules may be fixed relative to each other in the through-plane via at least one fixing means, such that the distance between all immediately adjacent battery cells of contiguous battery cell micromodules is substantially equal to the battery cell spacing of the battery cell micromodules.

To implement a series connection, the battery cell modules can in particular be arranged alternately in the housing shell, so that the positive terminal side and the negative terminal side of the modules are alternately adjacent to one another.

The fixing means may comprise electrically conductive micromodule connectors fixed to the tops or bottoms of adjacent battery cell micromodules and connecting them so that they are contacted and connected in series.

The fixing means may further comprise electrically non-conductive micromodule connectors which are fixed to the connecting plates which are not connected to each other in the course of series connection. This can ensure that each micromodule accommodated in the housing shell is mechanically connected to both adjacent micromodules on the upper side and on the lower side, respectively, and thereby all modules in the housing shell are fixed on the one hand and are kept at a predetermined distance from each other on the other hand, so that no battery cells are in direct contact with their outer sides.

The connecting plates can each have contact plates, which connect the battery cells of the battery cell pairs mechanically rigidly and electrically to each other. The contact plates can be welded to the battery cells at the ends in the central area of the battery cells. The connection plates can further each have contact plate connectors connecting the contact plates, which can have a zigzag-shaped course along the battery cell micromodule corresponding to the arrangement of the battery cell pairs with respect to one another. The contact sheets and the contact sheet connectors may be welded together to form a connecting sheet. The contact sheets and the contact sheet connectors may also integrally form a connecting sheet. The contact sheets may each have at least one slot-shaped aperture at the end thereof, each of which is substantially aligned with the longitudinal axes of the battery cells. The contact sheet connectors may also have these slot-shaped apertures, each of which is disposed substantially centrally between adjacent pairs of battery cells. The slot-shaped apertures may each have a central flare, which facilitates the insertion of corresponding mating elements. The slot-shaped apertures may be arranged in particular parallel to the end walls of the housing shell.

Further, the fixing means may comprise electrically conductive micromodule connectors fixed to and connecting the conductive tops and bottoms, respectively, of adjacent battery cell micromodules so that they are contacted and connected in series. The micromodule connectors may have a plurality of connecting portions, each of which is fixed to defined portions of adjacent connecting sheets of adjacent battery cell micromodules. The micromodule connectors may further comprise a center web connecting the connecting portions, the center web being disposed substantially perpendicular to the connecting portions. The central web may have a straight path, such that the end portions of the uniformly shaped connecting sections extending therefrom are also linearly aligned with each other. Alternatively, the micromodule connector may be implemented by a rectangular sheet having outer dimensions such that the outer edges of the sheet are respectively attachable to the upper or lower surfaces of adjacent battery cells. The central web may also have a zigzag shape which follows the offset of adjacent pairs of battery cells, so that the outer end portions of the uniform connecting portions also each have a zigzag shape in the face direction. In this case, the micromodule connector may alternatively be formed as a one-piece zigzag-shaped plate. Where the micromodule connector extends in a zigzag shape, it is preferably fixed with the connecting portions respectively on the connecting sheet portions fixed on the upper or lower surfaces of adjacent battery cells. If the micromodule connector is rectilinear in shape, it is preferably fixed with the connecting portions respectively on the contact sheet connectors connecting the pairs of battery cells in the center, since the centers of the contact sheet connectors are linearly aligned with each other even when the pairs of battery cells are offset from each other in a zigzag shape. All micromodule connector shapes may be conductive or non-conductive.

For fixing the micromodule connectors, the connecting sections can each have beveled tabs at their outer end sections, which are designed to engage in the slot-shaped grooves of the connecting plates. The folded tabs may have rounded corners which, in addition to the flares in the slot-shaped apertures, facilitate insertion into the slot-shaped grooves.

Alternatively or additionally, the micromodule connectors can be welded to the respective connecting plates.

The fixing means may also comprise a filler adhesive, which is placed between the battery cells in the housing shell. All non-conductive micromodule connectors may be dispensed with, while the conductive micromodule connectors extend alternately between the top surfaces and between the bottom surfaces of adjacent micromodules.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
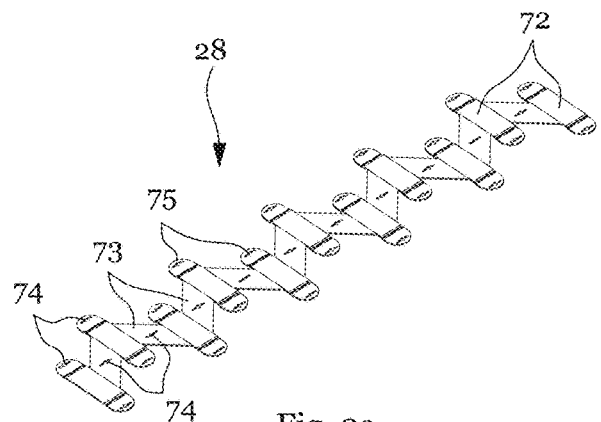
Figure 3A:
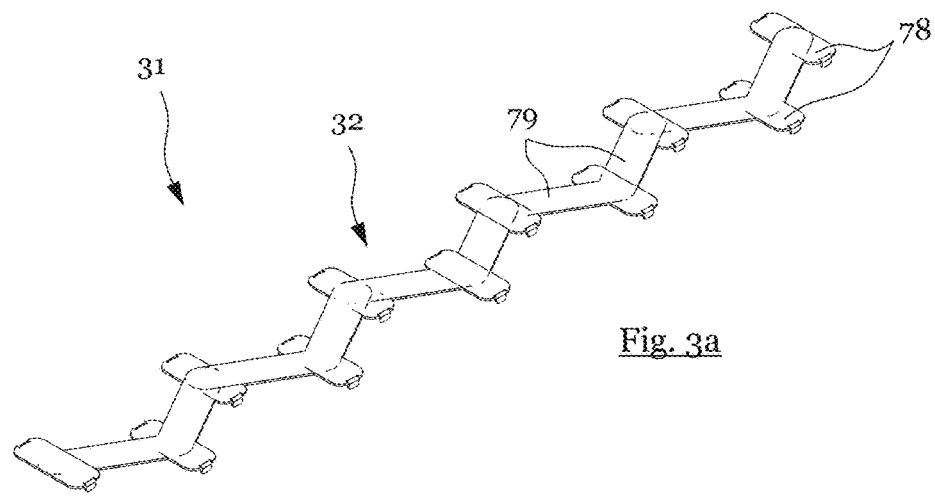
Figure 3B:
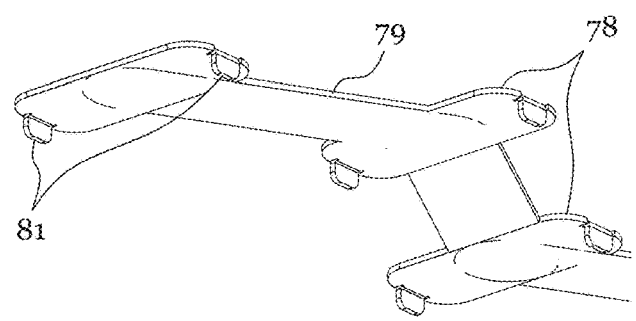
Figure 3C:
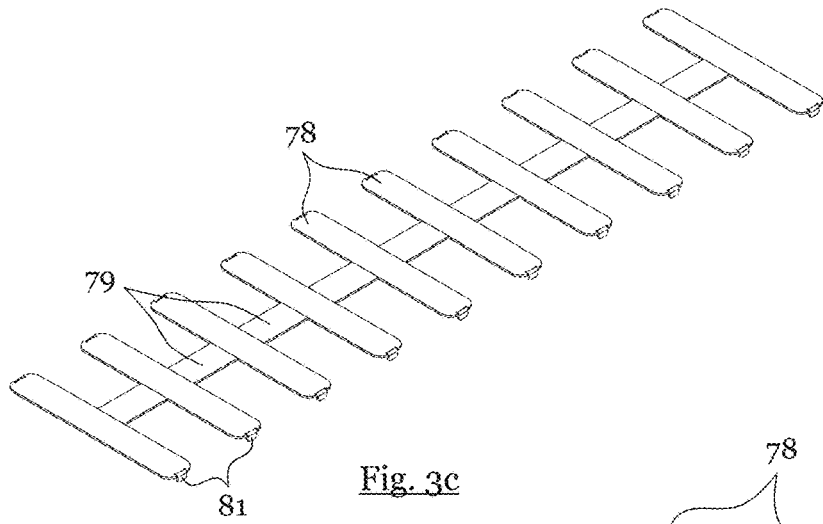
Figure 3D:
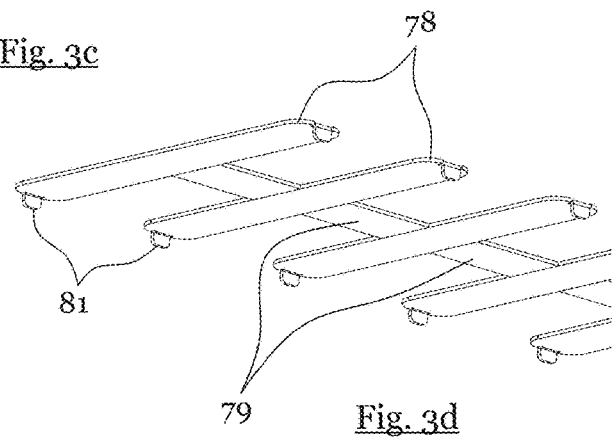
Figure 4A:
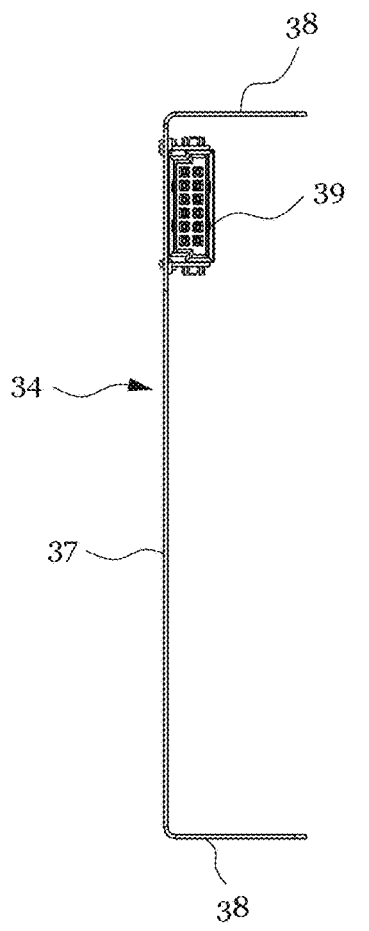
Figure 5A:
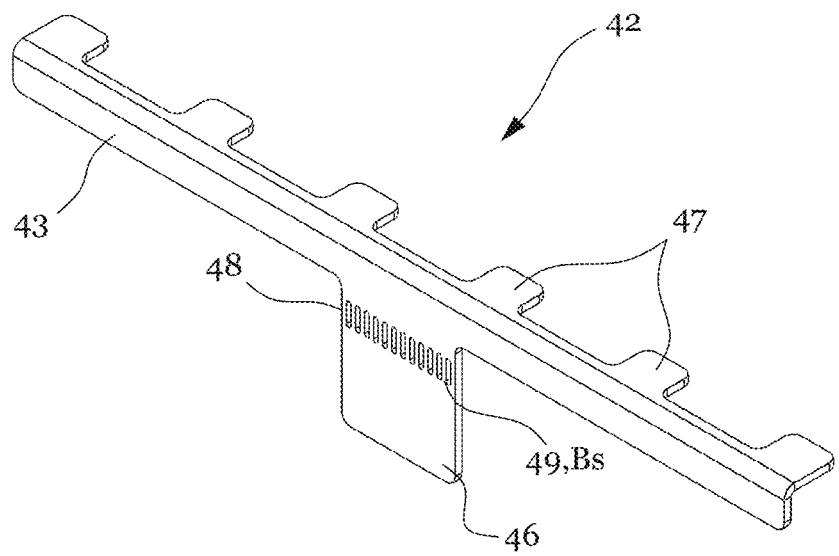
Figure 6A:
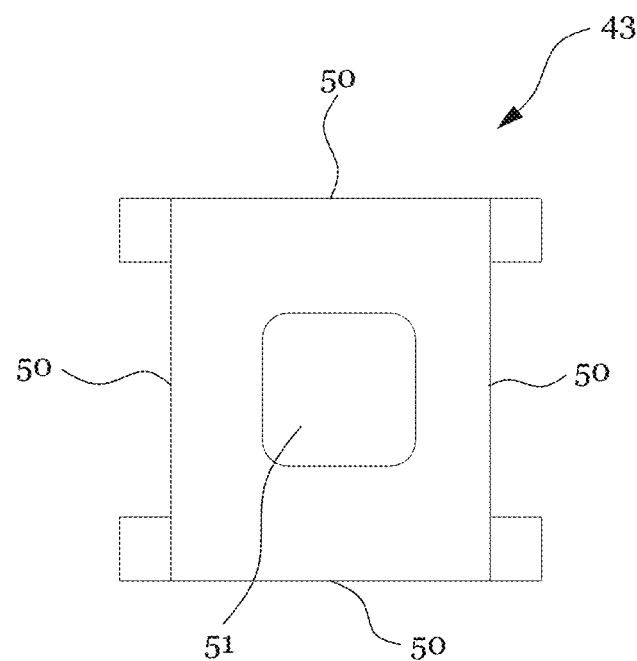
Figure 7A:
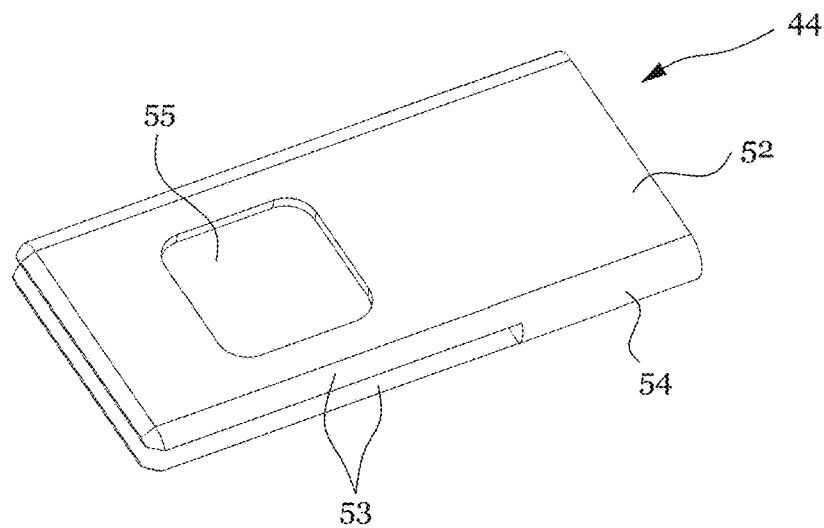
Figure 8A:
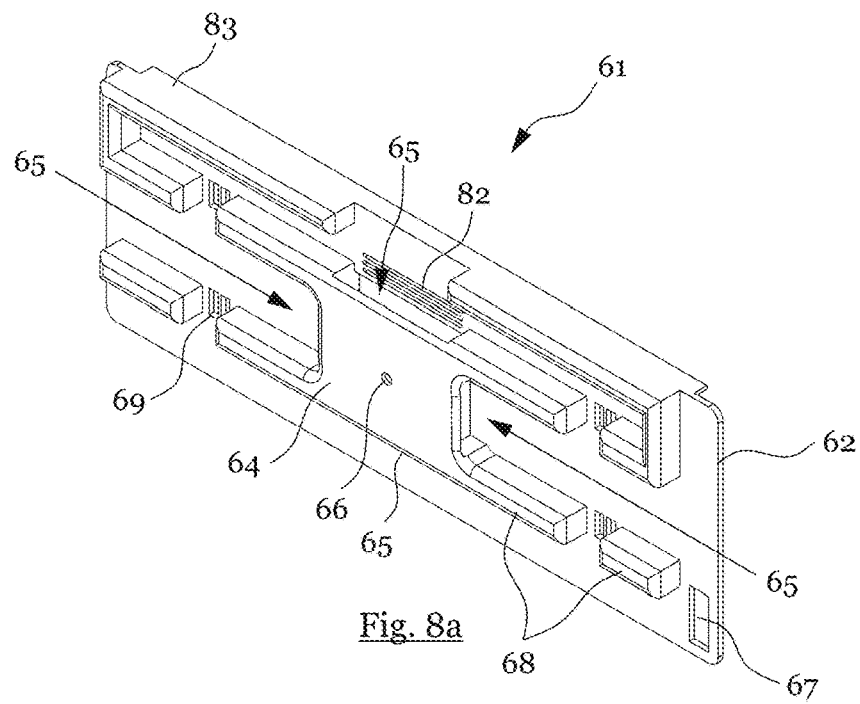
Figure 9A:
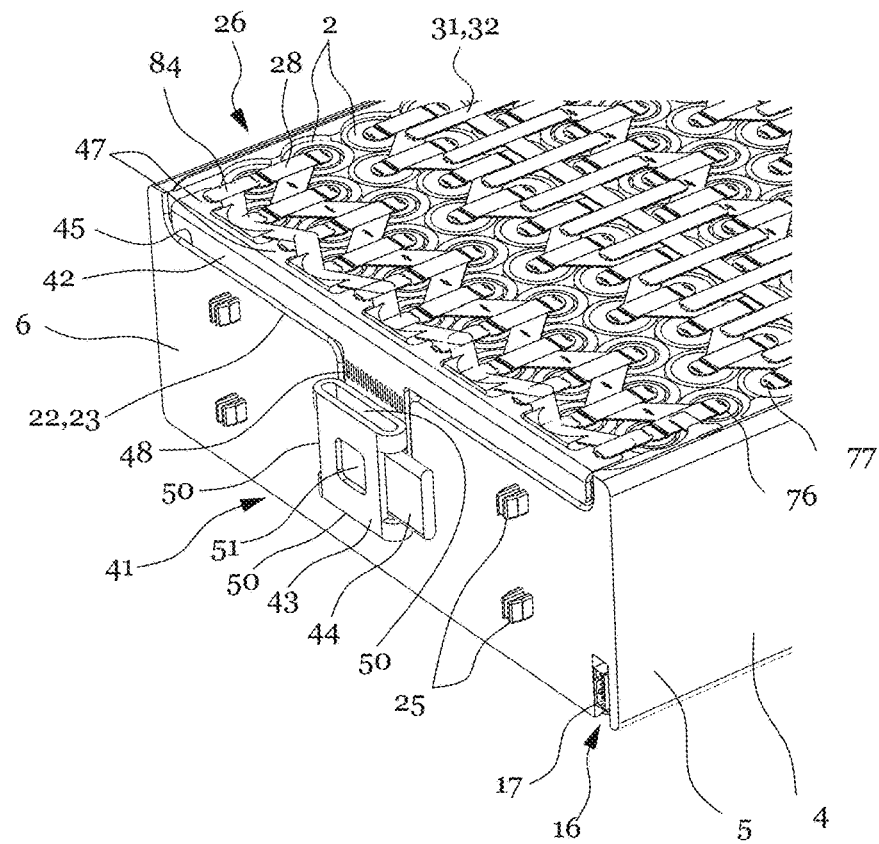
Figure 11A:
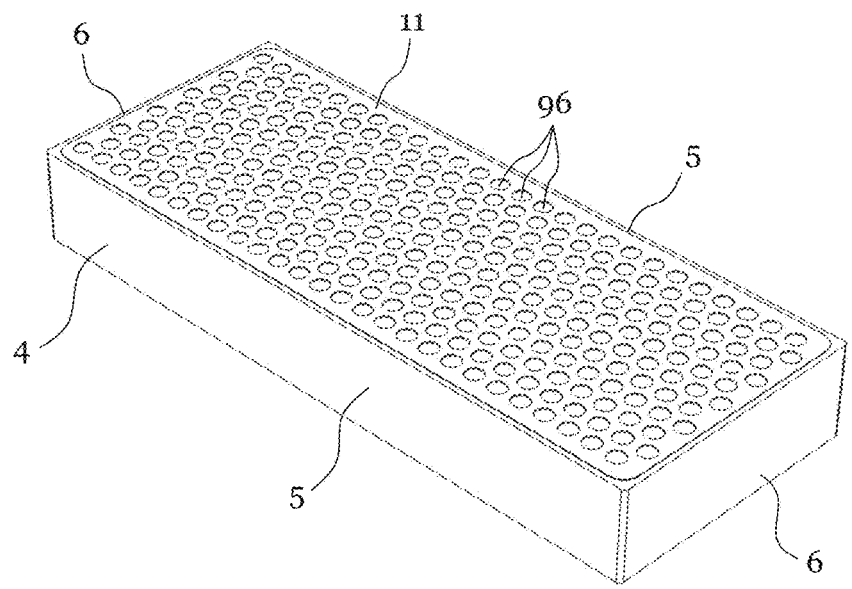

Further features, advantages and characteristics of the invention can be seen in the following description of preferred embodiments of the invention with reference to the accompanying drawings, in which show:

FIG. 1a/b a perspective view of a housing shell and a top view of a end wall of the housing shell;

FIG. 2a/b/c a representation of a cell connector for a micromodule as well as an upper and a lower view of a micromodule connected by means of a cell connector;

FIG. 3a/b/c/d perspective views of micromodule connectors, a straight embodiment and a zigzag embodiment;

FIG. 4a/b/c a top view of a PCB with PCB connection socket, a cross-section through a housing shell in the area of a through-opening with inserted PCB, a perspective view of a PCB with folded intermediate pick-ups;

FIG. 5a/b/c a perspective view of a power plug, a frontal view and a top view of a power plug;

FIG. 6a/a top view of a socket, a perspective view of a socket;

FIG. 7a/b/c a perspective view of a power plug, a perspective view of a power plug with inserted contact clip, a perspective view of a contact clip;

FIG. 8a/b/c a perspective view of a housing cover, a front view and a rear view of a housing cover;

FIG. 9a/one partial perspective view of a battery cell macromodule without attached housing cover, a partial perspective view of a battery cell macromodule with attached housing cover;

FIG. 10a/b perspective views of the lid inner plate/lid outer plate;

FIG. 11a/b/c a perspective view of a housing shell with attached lid with perforated predetermined breaking surfaces, a cross-sectional view of a battery cell macromodule in case of outgassing, a perspective view of battery cells in case of outgassing;

FIG. 12a perspective view of a battery cell macromodule without a housing shell.

DETAILED DESCRIPTION

Example embodiments will now be described more fully with reference to the accompanying drawings.

Figure 1B:
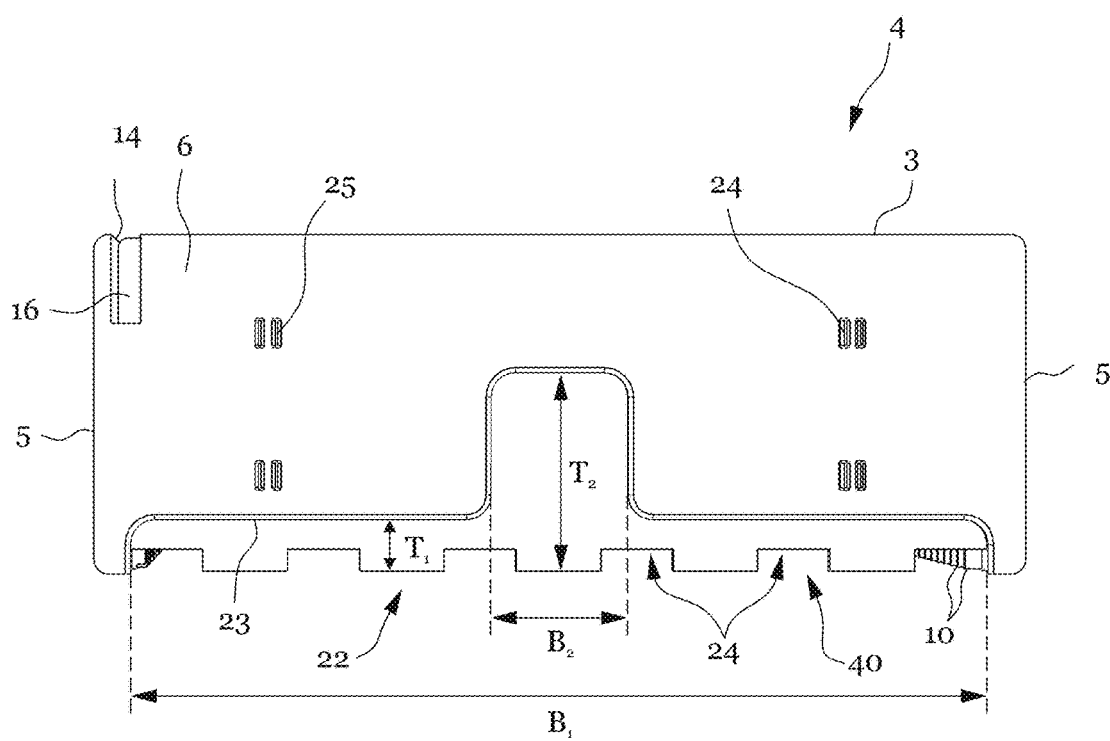

FIG. 1 shows the housing shell 4 of the battery cell macromodule 1 with parallel spaced longitudinal walls 5 and end walls 6, which enclose the inner space 3. Positioning indentations 8 are arranged on the inner sides 7 of the walls in each case, which indentations extend perpendicularly to the passage plane 9 and which are formed as half-shells 80 and are arranged on the longitudinal walls 5 on the one hand and the end-face walls 6 on the other hand in each case at regular intervals. The distances between the positioning indentations 8 on the end-face walls 6 are greater than those between the positioning indentations 8 on the longitudinal walls. The distances are realized by rib-shaped separating elements 10, which accordingly have a greater thickness on the end-face walls 6 than on the longitudinal walls. In the embodiment shown, the half-shells 80 each extend from the upper side 20 of the housing to the lower side 21 of the housing. A longitudinal groove 14 extends parallel to the longitudinal walls 5 through the upper longitudinal wall 5, which is shown in FIG. 1a, and opens into the recess 16 in the lower end-face wall 6, the longitudinal groove 14 extending to the last separating element 10 in front of the opposite wall 6, but not opening into this opposite wall 6. The longitudinal groove 14 is used for inserting a circuit board 34 which, by means of intermediate taps 38 arranged at regular intervals, taps cell voltages and temperature values of the battery cells 2, processes them and forwards them, for example, to a higher-level battery management system (BMS). The intermediate taps 38 of the circuit board 34 are thereby guided by grooves 18, which extend through the separating elements 10 perpendicularly to the longitudinal wall 5 in which the circuit board 34 is accommodated. It can be seen that a corresponding 18 groove is performed on every fourth separating element 10. In response to the sensed values, the battery cell macromodule 1 may be controlled with appropriate commands. It can further be seen that four latching elements 25 are symmetrically arranged on the visible outer side 19 of the front side wall 6, and a recess 22 with a step-shaped edge 22 is formed on the lower side 21 of the housing, the recess having a first width $B_1$ with which the recess 22 extends with a depth $T_1$ starting from the lower side 21 of the housing over the front side wall 6. In the central region of the recess 22, the recess 22 has a depth $T_2$ which is increased relative to the first depth $T_1$ over a width $B_2$. On the separating elements 10 adjacent to the recess 22, it can be seen that recesses 24 of rectangular cross-section formed perpendicularly to the end-face wall 6 are provided in each case, which, together with the positioning indentations 8 located therebetween, form a castellated structure 40. It can further be seen that the housing shell has a largely symmetrical structure, since the elements arranged on the end-face walls 6, such as the latching elements 25, the recess 22 with a step-shaped edge 23 and the castellated structure 40, are formed on the outer side 19 of the respective opposite end-face wall 6 rotated by 180 degrees with respect thereto, so that one recess 22 is open towards the housing underside 21 and the other is open towards the housing upper side 20. The housing shell 4 has defined interfaces on its respective peripheral edges formed by the four walls 5, 6 on the housing upper side 20 and on the housing lower side 21 in order to attach the cover plates 11, 12, 13. The circumferential edges on the upper and lower sides of the housing further comprise sealing surfaces for shielding the battery cell macromodule 26 from external influences.

FIG. 2 shows a battery cell micromodule 27 which can be accommodated in the macromodule housing 1. FIG. 2a shows a cell connector 28 for connecting the battery cells 2 to one another, which is formed from a plurality of contact plates 72 which are connected to one another by means of contact plate connectors 73. The outer sides of the contact sheets each have slot-shaped apertures 74, which furthermore each have a circular widening 75 in the centre of the aperture 74, which facilitates the insertion of complementary mating elements. The contact plates 72 and the contact plate connectors 73 are arranged in such a way that the contact plates 72 are aligned parallel to one another and, as a result of the zigzag-shaped contact plate connectors 73, each have an offset alternately to the right or to the left, the offset alternating constantly. As a result, each of the contact sheets 72 next but one are aligned with respect to each other in a straight line, resulting in two parallel rows of contact sheets 72. The cell connector 28 has two functions. One is to fix the battery cells 2 relative to each other. The other task is to further fix the battery cells 2 at a predetermined distance d from each other, so that there is no contact between the outer surfaces of the battery cells 2.

Figure 2B:
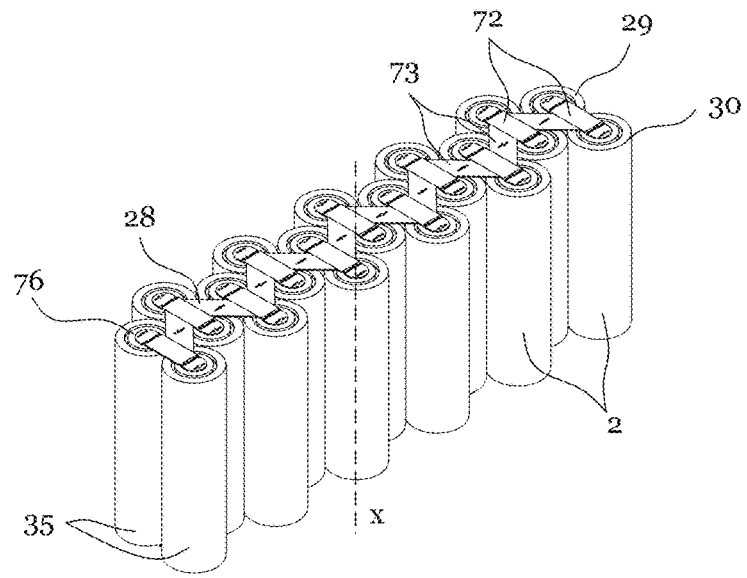
Figure 2C:
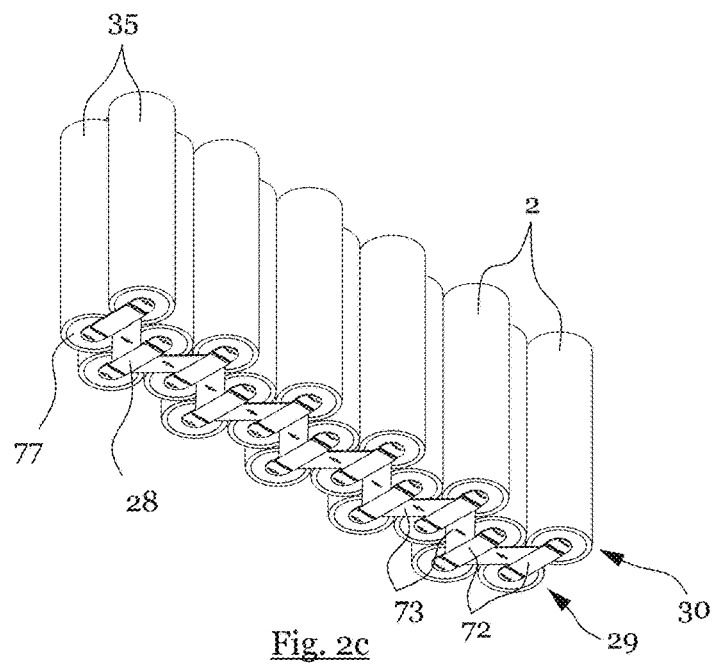

FIGS. 2b and 2c each show a micromodule 27 from above (2b) and below (2c), with the positive terminal side visible in FIG. 2b and the negative terminal side visible in FIG. 2c. Both sides are each connected by a cell connector 28 as shown in FIG. 2a. The micromodule consists of a plurality of cylindrical battery cells 2 with parallel aligned longitudinal axes X, which are each connected to one another in pairs in the form of battery cell pairs 35 via a contact plate 72 in each case, the contact plates being welded to the respective sides (positive pole 76, negative pole 77). Due to the zigzag offset of the cell connector 28, the battery cell pairs 35 of the micromodule 27 also have a corresponding offset relative to one another, so that the battery cells 2 all have the same distance from one another when packed as densely as possible. Thus, in the main direction of spread of the micromodule, there are two parallel rows 29, 30 of battery cells extending side by side in a zigzag manner. The cell connector 28 is thereby dimensioned such that a free space remains between all cell outer sides, so that there is no contact between all adjacent battery cells 2.

The micromodules 27 can be fixed to each other in the housing shell 4, or positioned with a defined distance to each other via the micromodule connectors 32. FIG. 3 shows two different embodiments of the micromodule connector 32, a zigzag-shaped version, shown in FIGS. 3a and 3b, and a rectilinear version, shown in FIGS. 3c and 3d. In this regard, the micromodule connector 32 includes a center test bar 79 from which a plurality of connecting sections 78 extend away at regular intervals, the intervals corresponding to the spacing of two pairs of battery cells 35 within a micromodule 28. At opposite ends of each of the connecting sections 78 are beveled tabs 81, which are configured for insertion into slot-shaped apertures 74 in the contact plates 72 or the contact plate connectors 73. The connecting portions 78 each have the same length, although the connecting portions 78 of the rectilinear embodiment of the micromodule connector 32 are longer than those of the zigzag-shaped micromodule connector. This is because the connecting portions 78 of the rectilinear embodiment of the micromodule connector 32 are provided for insertion into the slot-shaped apertures 74 arranged in the contact sheet connectors 73, whereas, in contrast, the connecting portions 78 of the zigzag-shaped embodiment of the micromodule connector 32 are provided for insertion into the apertures 74 in the contact sheets 72. Since the distances between adjacent battery cells 2 and contact sheet end portions of two adjacent micromodules 27 fixed thereon are smaller than the distance between two contact sheet connectors 73 of two adjacent micromodules 27, the connecting portions 78 of the rectilinear embodiment of the micromodule connector 32 must be correspondingly longer than the connecting portions 78 of the zigzag embodiment of the micromodule connector 32. The same distance d is provided between the battery cells 2 of two adjacent micromodules 28 as between two battery cells 2 of the same micromodule 28. The connecting section 78 of the zigzag-shaped embodiment of the micromodule connector 32, which is to be fastened in each case centrally in alignment with the longitudinal axes X of the battery cells 2 to be connected, therefore has a length which is equal to the cell diameter of the battery cells 2 plus the distance d to be provided between the battery cells 2. In contrast, the connecting portion 78 of the rectilinear embodiment of the micromodule connector 32 to be respectively fixed to the contact sheet connectors 73 has a length equal to two cell diameters plus twice the distance d to be provided between the battery cells 2. Accordingly, the ratio of the length of the connecting portions 78 of both embodiments of the micromodule connector 32 is 1 to 2.

Via the flare 75 in the form of a widened groove in the contact plates 72 and the contact plate connectors 73, it is possible to find and position the tabs 81 of the micromodule connectors 32 via the correspondingly shaped tab 81.

The groove shape is composed of a straight groove or the slot-shaped opening 74 with a circular cutout or the widening 75.

The slot-shaped aperture 74 as well as the flare 75 are rounded, thus ensuring easy finding and sliding into each other of the cell connector 28 and the micromodule connector 32. Both embodiments of the micromodule connector 32 may optionally be either electrically conductive or electrically insulating.

Alternative spacing or positioning of the micromodules 28 by means of a filler adhesive between the micromodules 28 is also possible. In this case, by means of conductive micromodule connectors 32, only those micromodule poles 28 are connected to each other which are required for contacting the series connection of the micromodules 28, while the remaining micromodule poles remain unconnected. The further positioning and fixing of the micromodules 28 relative to each other is then carried out by means of a filler adhesive, which is introduced between the individual battery cells 2 in the macromodule housing 1 and cures there. Preferably, this filler adhesive has a high thermal conductivity in order to be able to effectively transport heat away from the interior of the housing 3.

Figure 4B:
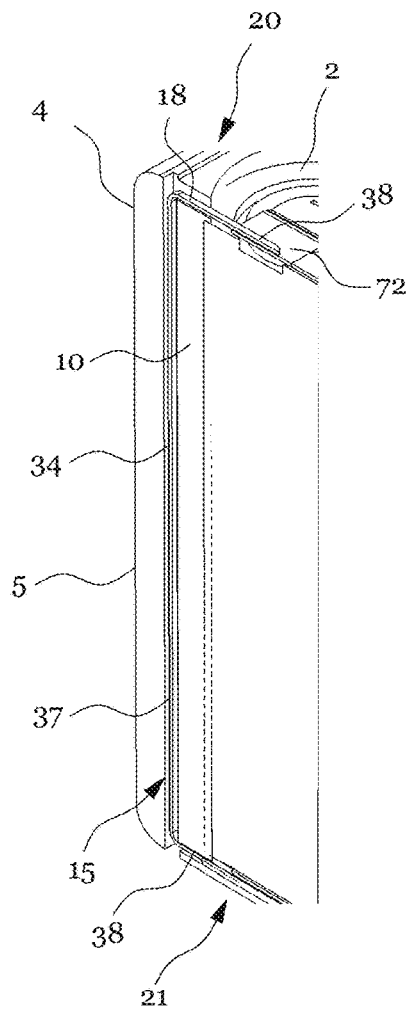
Figure 4C:
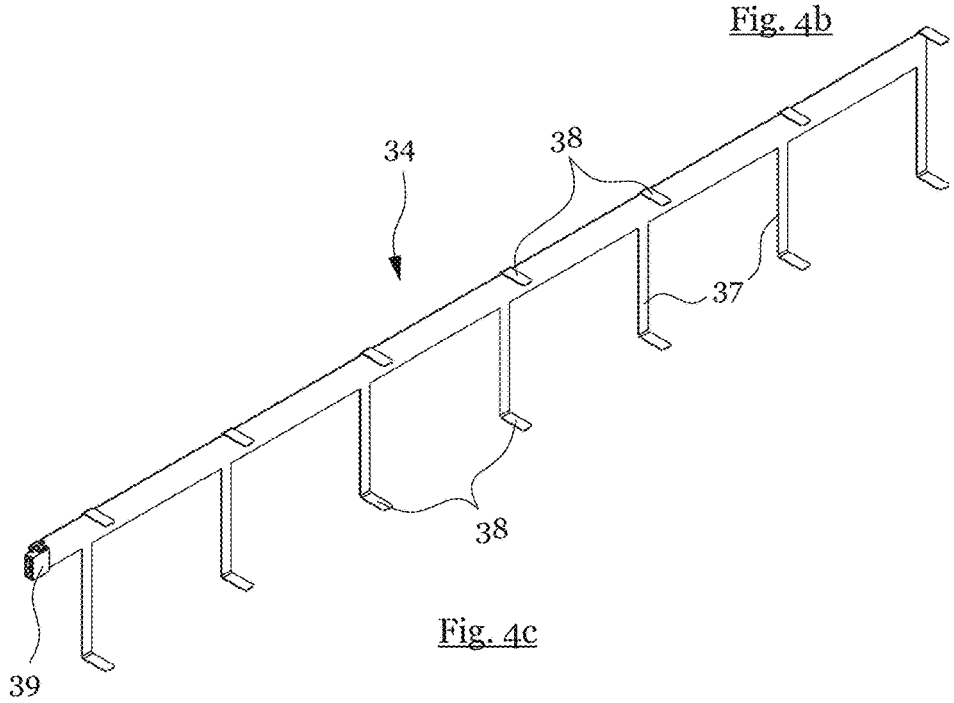

FIGS. 4a-c illustrate the BMS board 34, which is configured for insertion into the longitudinal groove 14 in the housing shell 4. To this end, the circuit board 34 comprises an elongate board body adapted to the shape of the longitudinal groove 14 and a plurality of arms 37 extending therefrom, for example seven as shown. At the upper side of the board 34, which faces in the direction of the upper side 20 of the housing, and at the ends of each of the arms 37, the board has intermediate taps 38 which are bent at right angles in the direction of the interior of the housing 3. The intermediate grips 38 on the upper side and lower side of the circuit board 34 are respectively aligned with each other. Thus, the illustrated circuit board 34 has fourteen intermediate handles 38. The intermediate taps 38 are arranged at regular intervals, so that a tap can be made at every fourth partition 10 of the housing shell 4. At the end the board body is flush with the last intermediate tap, and at the front the board body has an overhang piece to which a board connection socket 39 is attached to the board 34, pointing towards the interior of the housing 3. FIG. 4b shows a cross-sectional view through a longitudinal wall 5 of a printed circuit board 34 inserted into a housing shell 4 and, in particular, through a through opening 15 through which an arm 37 extends. It can be seen that the intermediate taps 38 are each chamfered at the level of the upper side and the lower side of the adjacent battery cell 2, and are each connected to a contact plate 72 connecting two battery cells 2 of a battery cell pair 35. Furthermore, it can be seen that the intermediate taps 38 are guided by grooves 18 formed in the corresponding separating elements 10 perpendicularly to the longitudinal wall 5. Defined kinks may be arranged between the intermediate taps 38 and the circuit board 34 or the arms 37, respectively, for precise positional alignment of the intermediate voltage taps 38. The circuit board 34 may be an integral part of the battery module 26.

The circuit board 34 can be designed as a line string for contacting the micromodules 28 via intermediate taps 38, with the transfer of the measurement voltages to higher-level slaves taking place via the circuit board connection socket 39 and an adapter cable connected thereto, which is routed through the aperture 67 in the housing cover 61. In particular, the intermediate taps 38 may be configured to sense cell voltages and temperatures.

The circuit board 34 may alternatively be designed as a BMS slave, in which case the integration of the slave components such as microcontrollers, resistors, multiplexers, etc. is performed on the board body.

Figure 5B:
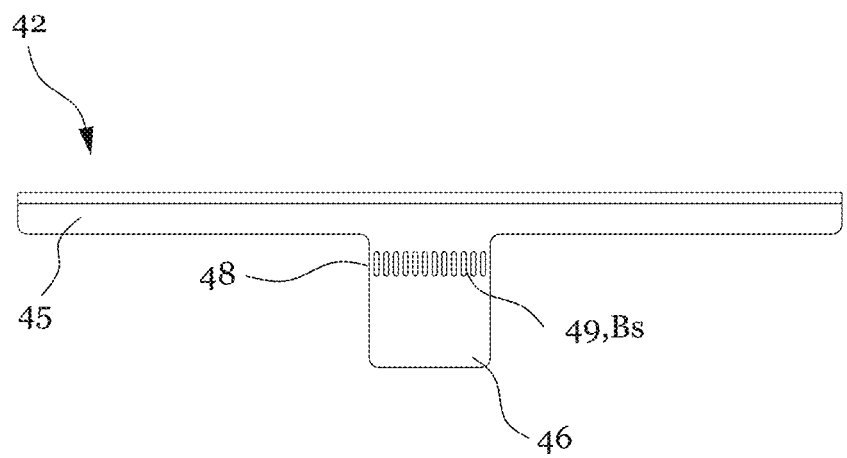
Figure 5C:
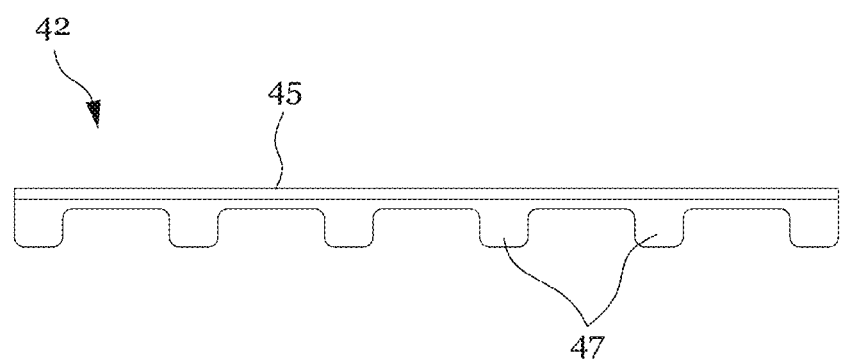

FIG. 5a-c shows three views of a power plug 42, which is part of the contacting device 41 and establishes an electrical connection between the housing interior 3 and the housing exterior, more precisely between the micromodule 27 resting against the associated end wall 6 and the plug-in sleeve 43. The power plug 42 has a T-shaped configuration adapted to the recess 23 in the housing shell 4, the recess 23 having a contact surface for the power plug 42. For this purpose, the power plug 42 comprises a contact rail 43, to which a contact lug 46 is connected on the one side in the same plane and, on the other side and angled therefrom in the direction of the housing interior 3, a plurality of contact fingers 47. A melting fuse 48 is integrated at the upper end of the contact lug 46, which melting fuse 48 is formed by a plurality of parallel webs 49 with a respective web width $B_S$, a predefined spacing being provided between all the webs 49. These parameters can be used to set the burn-through behaviour or the overload current at which the melting fuse melts and interrupts the electrical contact. The melting fuse 48 may be made of the same material as the rest of the power plug 42, and the symmetrical design of the housing shell 4 allows symmetrical current collection on both sides of the module 26 via a respective contacting device 41.

In the assembled state, the contact fingers 47 engage through the recesses 24 in housing shell 4 and contact the external battery cell array via a micromodule connector 32, as shown in FIG. 9a. Furthermore, the contact tab 46 is welded to the rear side of the plug sleeve 43, whereby the power plug 42, the plug sleeve 43 and the housing cover 61 can be provided as a pre-assembled part.

Figure 6B:
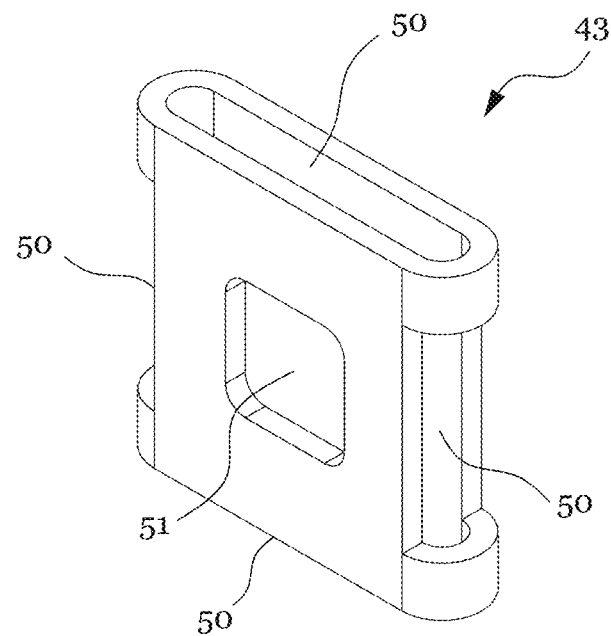

The flat tubular plug sleeve 43 shown in FIG. 6 has two parallel walls and offers four possible lateral insertion directions for the power plug 44. For this purpose, sections of the tube sections closing the tube are broken out laterally, each corresponding to an insertion opening dimension. In the example shown, the insertion directions are parallel to the plane of the end wall 6 to which the contacting device 41 is attached. The four insertion directions are perpendicular to each other. In this respect, the roof structure 64 on the housing cover 61 is formed accordingly, as can be seen in FIG. 8. The four insertion openings 50 all have the same cross-section. The insertion sleeve 43 also comprises a sleeve aperture 51 into which the clip 57 shown in FIG. 7 can engage. Accordingly, the sleeve aperture 51 and the clip 57 have corresponding dimensions.

Figure 7B:
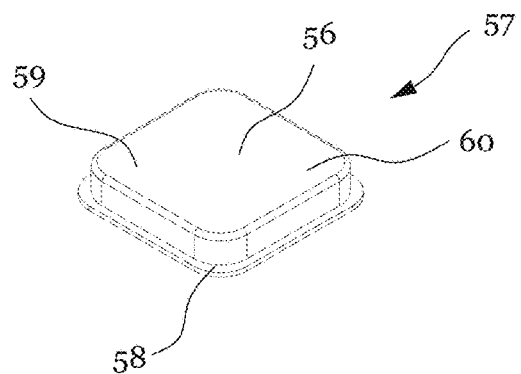
Figure 7C:
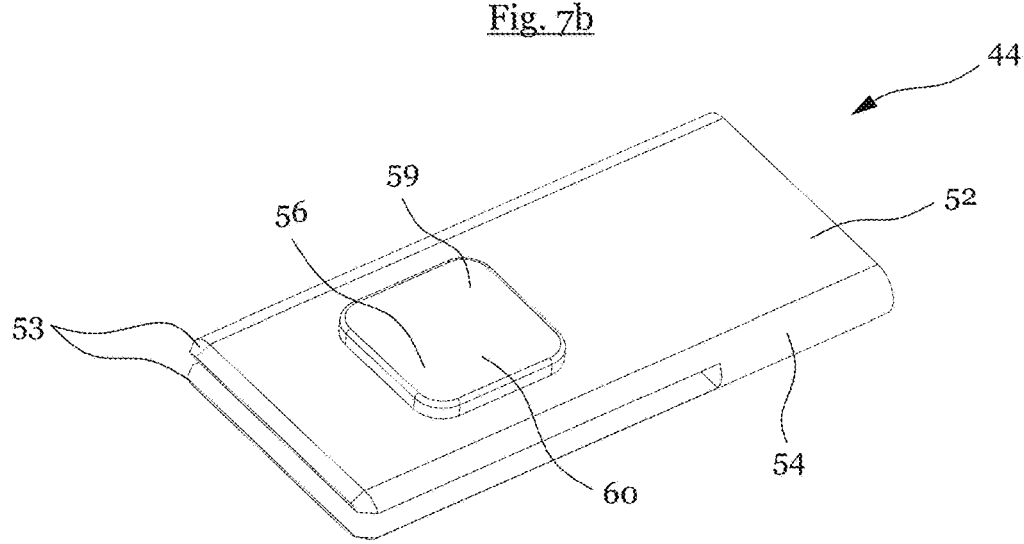

FIGS. 7*a-c* show the elements of a power plug 44 which is insertable into one of the insertion openings 50 of the plug sleeve 43. The power plug 44 comprises a plug element 52 having a retaining portion 54 from which two plug plates 53 extend in parallel spaced-apart relationship. The plug plates 53 are resilient so that they can be bent apart or compressed and return to their original shape when released. A clip aperture 55 is formed in one of the plug plates 53, which is a through opening. The dimensions of the clip aperture 55 correspond to those of a clip 57, which is another element of the power plug 44. As shown, clip aperture 55 and clip 57 may have a square cross-section with rounded corners, alternatively both elements may have a round cross-section. The thickness of the clip 57 is greater than the spacing of the spaced apart mating plates 53 to prevent it from falling out of the power plug 44. The clip has an upper clip portion 56, which has smaller dimensions than the clip aperture 55 and projects therethrough when inserted. In a lower portion, the clip 57 has a peripheral edge 58 which is dimensioned to engage behind the clip aperture 55 and thus prevent the clip 57 from slipping out of the clip aperture 55. The clip top 59 has a coloured marking, by means of which it is easier to check that the power plug 44 has been correctly inserted into the plug sleeve 43. For this purpose, the roof structure 64 has a through hole 66 through which the clip top 59 is visible in the correctly inserted state. FIG. 7*c* shows a power plug 44 with an inserted clip 57. The power plug 44 is clipped into the plug sleeve 43 by pushing the power plug 44 into one of the insertion openings 50 of the plug sleeve 43, so that the clip hooks into the centrally arranged symmetrical sleeve opening 51 by spring force, as can be seen in FIG. 9*a*.

Figure 8B:
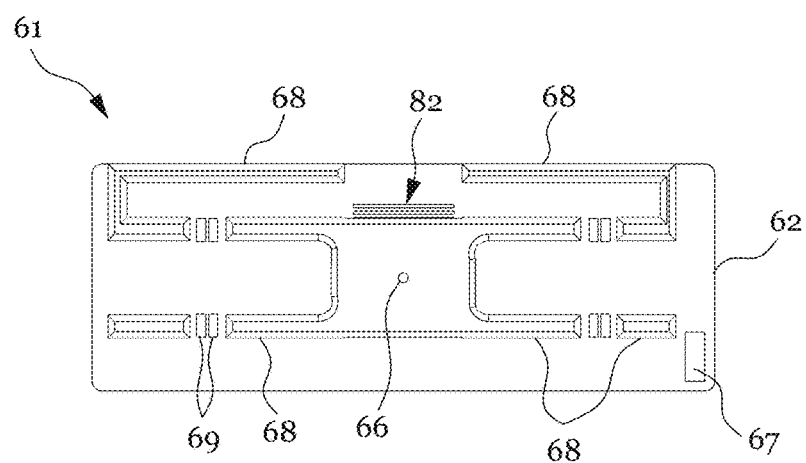
Figure 8C:
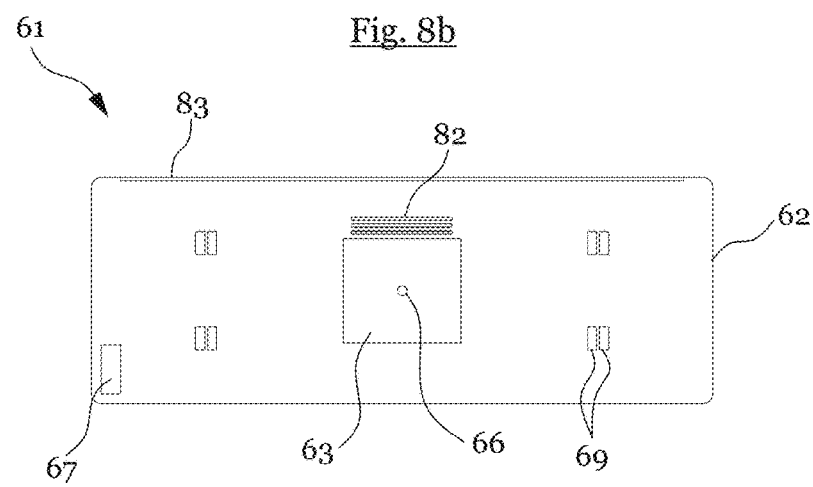

FIG. 8 shows the housing cover 61, which is designed to close the housing 1 at the end walls 6. The same cover variant can be used for both end walls 6, since the positive and negative sides of the housing 4 are symmetrically constructed. The housing cover 61 has a cover plate 62 which rests against the respective end-face wall 6 when the cover 61 is placed on the housing shell 4. In the rear view in FIG. 8*c*, it can be seen that the cover plate 62 has, arranged centrally, a through-opening 63 which is coordinated with the dimensions of the plug-in sleeve 43 in such a way that the plug-in sleeve can be inserted through the through-opening 63. A roof structure 64 extends on the front side of the housing cover 61 as shown in FIG. 8*a* over the through opening 63, so that there is a protection against contact with the contacting device 41 on the front side. The roof structure 64 extends parallel to the cover plate 62 at a distance therefrom which corresponds at least to the height of the plug sleeve 43, so that the latter can be completely accommodated under the roof structure 64. The roof structure 64 has roof openings 65 corresponding to the plug sleeve 43, through which the power plug 44 can be inserted from different directions into the insertion openings 50 of the plug sleeve. As shown in FIGS. 8*a* and 8*b*, the roof structure is supported by H-shaped stiffening ribs 68 which are arranged on the cover plate 62. The cover plate 62 shown also has further stiffening ribs 68, but these are all arranged so that they do not obstruct insertion of the power plug 44 into one of the insertion openings 50, 65. Furthermore, the stiffening ribs 68 are not located in the region perpendicular and horizontal to the aperture 67, which is aligned with the recess 16 in the housing shell 4, so as to leave space in these regions for routing along connecting cables which can be plugged into the board connecting socket 39 arranged in the recess 16 and facing the aperture 67. The roof structure 64 may include a through hole 66 aligned with the clip 57 located therebelow, such that when the power plug 44 is properly inserted, the clip 57 is visible through the through hole 66. The through hole 66 further serves the purpose of being able to release a clipped-in power plug 44 by using a pointed object to push the clip 57 into the plug sleeve 43, so that the power plug 44 can be removed. Above the roof structure 64, the cover plate 62 has a viewing window 82 which is formed by horizontally arranged slots and which is aligned with the melting fuse 48 arranged below and covered by the cover plate 62, so that it can be checked from the outside of the housing whether the melting fuse 48 is still intact. In each case, the slots are sufficiently narrow that it is not possible to reach through them with a finger. Furthermore, the slots are arranged perpendicular to the webs 49 of the melting fuse 48 so that the melting fuse 48 can be checked particularly easily. The housing cover 61 may further comprise a bevel 83 at the upper end of the cover plate 62, which bevel extends over the respective end wall 6 when the cover 62 is in place, over the contact fingers 47, thereby providing a contact protection. For fixing the housing cover 61 to the end-face walls 6, the cover plate 62 has corresponding latching apertures 69 corresponding to the latching elements 25, which can be engaged behind by the latching sections 71 of the latching elements 25 in order to fix the housing cover 61. The width of the latching apertures 69 is thereby greater than that of the latching portions 71, so that the latter can be inserted through the latching apertures 69.

Figure 9B:
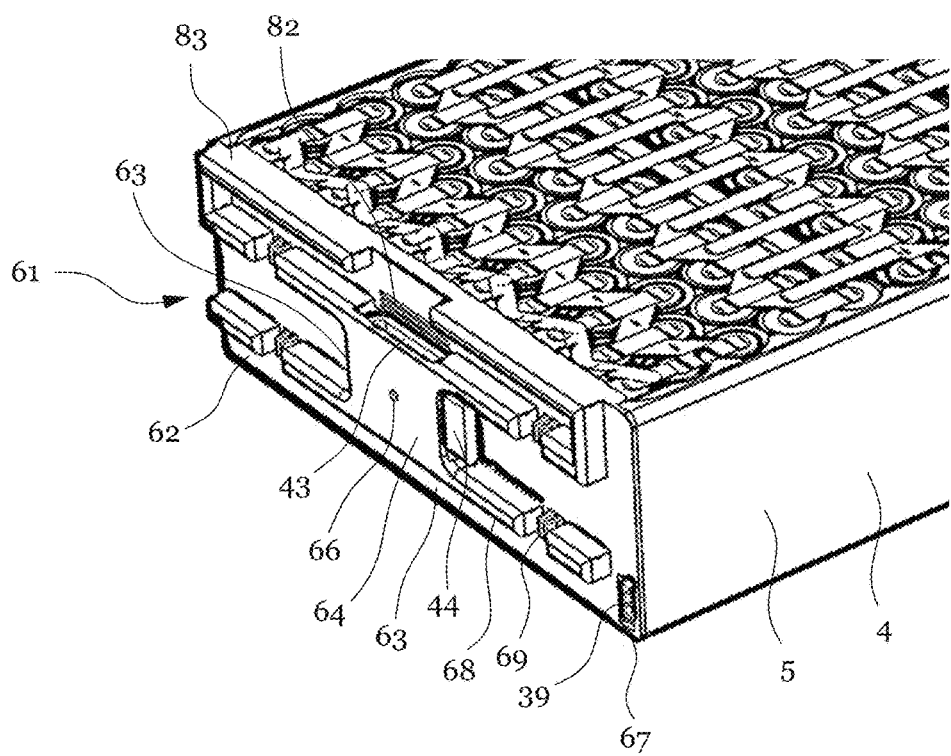

FIG. 9*a* shows a section of a battery cell macromodule 26, wherein a plurality of micromodules 27 are accommodated in the housing shell 4 with their positive poles 76 and their negative poles 77 alternately facing the upper side 20 of the housing. The battery cells 2 of the micromodules 27 are coupled to each other by means of cell connectors 28, and are thereby fixed and positioned relative to each other at the predetermined distance d. Below each other, the micromodules 27 are coupled and electrically connected to each other via micromodule connectors 27 to implement the series connection. In this connection, the micromodule 27 shown, which rests against the end wall 6, is coupled to the contact fingers 47 of the power plug 42 via a contact connector 84, one contact finger 47 being provided for each pair of battery cells 35. The contact connector 84 has a zigzag-shaped course and is connected on one side via contact sections to the outer battery cells 2 of the outermost micromodule 27, which are aligned in a zigzag-shaped arrangement with respect to one another. On the wall side, the contact sections have a rectilinear course in order to connect the contact sections of the contact connector 84 to the rectilinearly aligned contact fingers 47. It can be seen that the power plug 42 is received in the recess 22 and abuts the frontal housing wall 6 in parallel therewith. The plug sleeve 43 is welded to the contact tab 46 of the power plug 42. By way of example, the power plug 44 is inserted from the right into the right-hand insertion opening 50 of the plug-in sleeve and is engaged by the clip 57 in the sleeve aperture 51. For illustrative purposes, the module 26 is shown in FIG. 9*a* without the housing cover 61 in place so that the contacting device 41 is visible, but the module 1 is only put into operation as long as the housing cover 61 and the covers 11 are fixed to the upper side 20 and lower side 21 of the housing 1. It can also be seen that a circuit board 34 is inserted into the longitudinal groove 14 and the circuit board connection socket 39 attached thereto is received in the recess 16, so that a plug can be inserted into it through the aperture 67. FIG. 9*b* shows the battery cell macromodule 26 with the cover 61 in place and the power plug 44 inserted into one of the insertion apertures 50 of the plug sleeve and through the corresponding roof aperture 65 in the roof structure of the housing cover 61.

Figure 10:
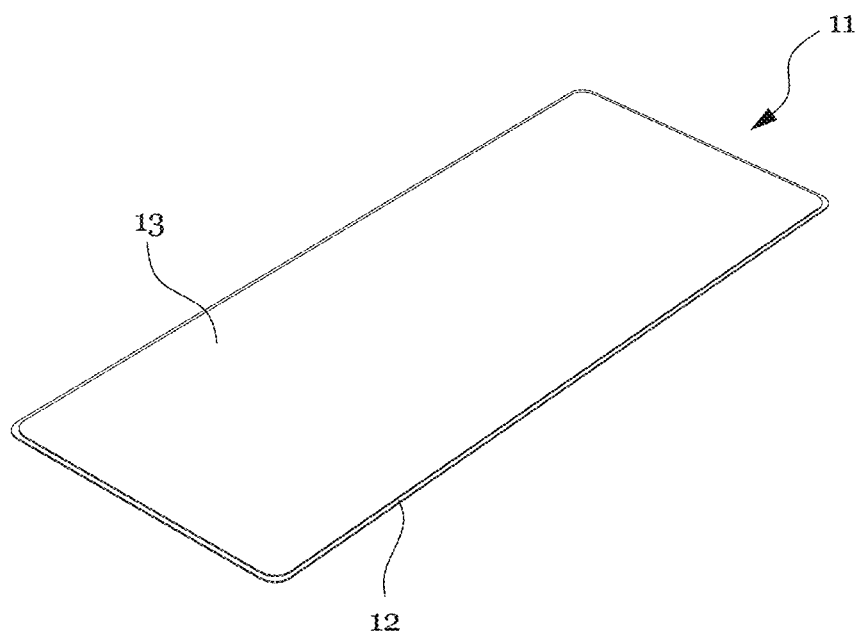
Figure 10B:
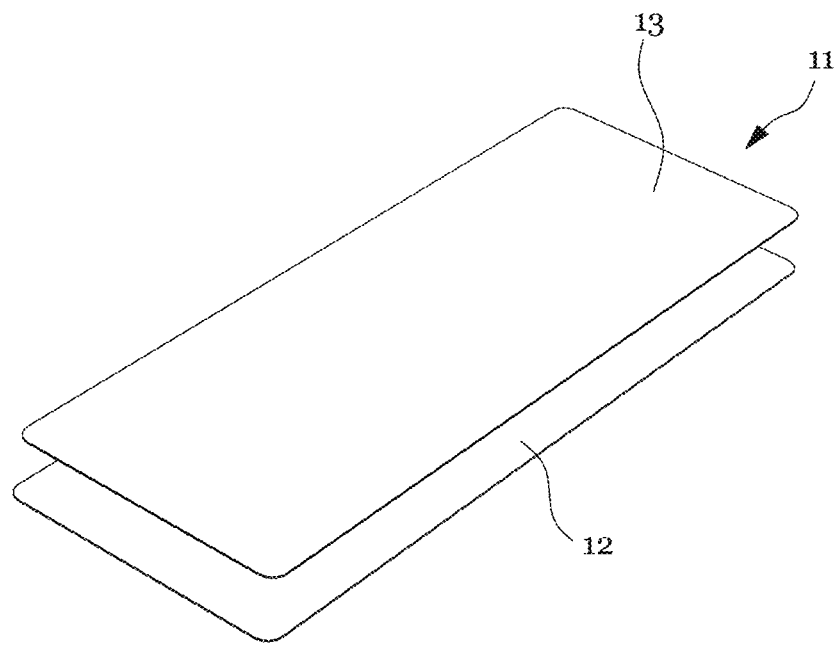

The upper and lower sides of the housing are each realized by two superimposed plates 12, 13, as shown in FIG. 10, the outer plate 13 on the outer sides of the module being made of a metallic material or plastic. The outer plate 13 serves to mechanically stabilize the module 26 and the micromodules 27 as well as to effectively dissipate heat. The plate 12 to the inside of the module is designed as a so-called gapfiller, which is non-conductive. This ensures that the active parts are protected against contact and that heat transfer from the cell and micromodule connectors is facilitated. Furthermore, the micromodules 27 experience clamping and further positioning in the direction of the longitudinal axes X of the battery cells 2. Furthermore, the vibration input to the micromodules 27 is damped. The plates 11 may be attached to the housing shell by means of screw connections or adhesive connections.

Figure 11B:
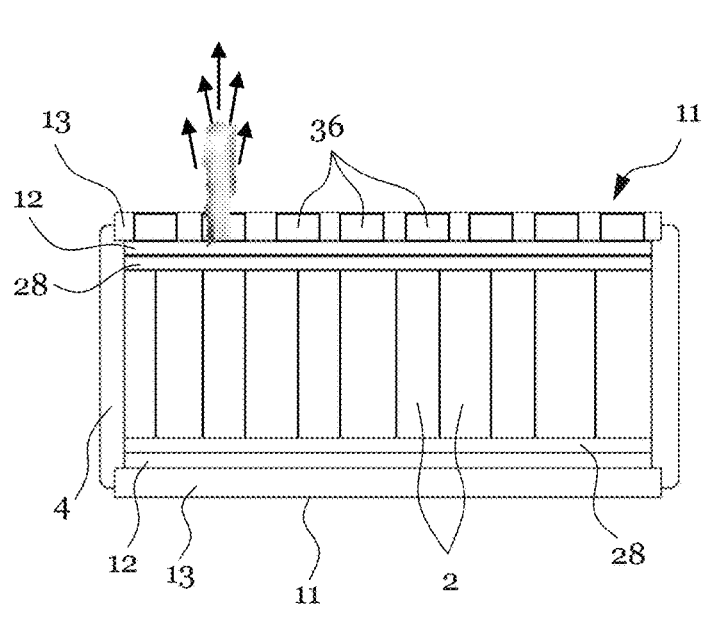
Figure 11C:
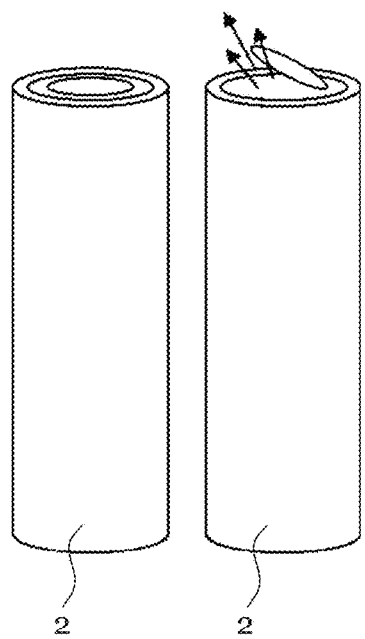

As shown in FIG. 11*a*, the plates can have perforated predetermined breaking surfaces 36, so-called "vents", which represent predetermined breaking points in the event of a cell event (outgassing) in order to be able to quickly discharge the gases. These are preferably arranged centrally above each battery cell 2. The module upper and lower surfaces 20, 21 can be connected to cooling plates over their entire surface. To ensure good heat dissipation, the inner plates 12 are electrically insulating and thermally conductive, while the outer plates 13 are thermally conductive. FIG. 11*b* shows a cross-section through a battery cell macromodule 26 during a degassing process. Malfunction induced outgassing of one or more cells 2 causes the hot gases to bend the cell connector 28, which is designed to allow bending while still maintaining mechanical integrity. The hot gases then pierce the inner plate 23 and flow out of the module 27 through the opening in the housing cover 11, the advantage of this being that in normal operation the heat from the cells can be dissipated through the inner plate 12 and released to the housing. In the event of a fault, the hot gases pass through the inner plate 12 above the outgassing cell so that the hot gases can be discharged from the module. In this case, the cover plate 13 above each cell may be perforated, as shown in FIG. 11*a*. It is important that the diameter of the outgassing vents is smaller than the outside diameter of the cells 2, but larger than the outgassing cap of the cell 2, so as to encourage the cell to open and the hot gases to escape.

Figure 12:
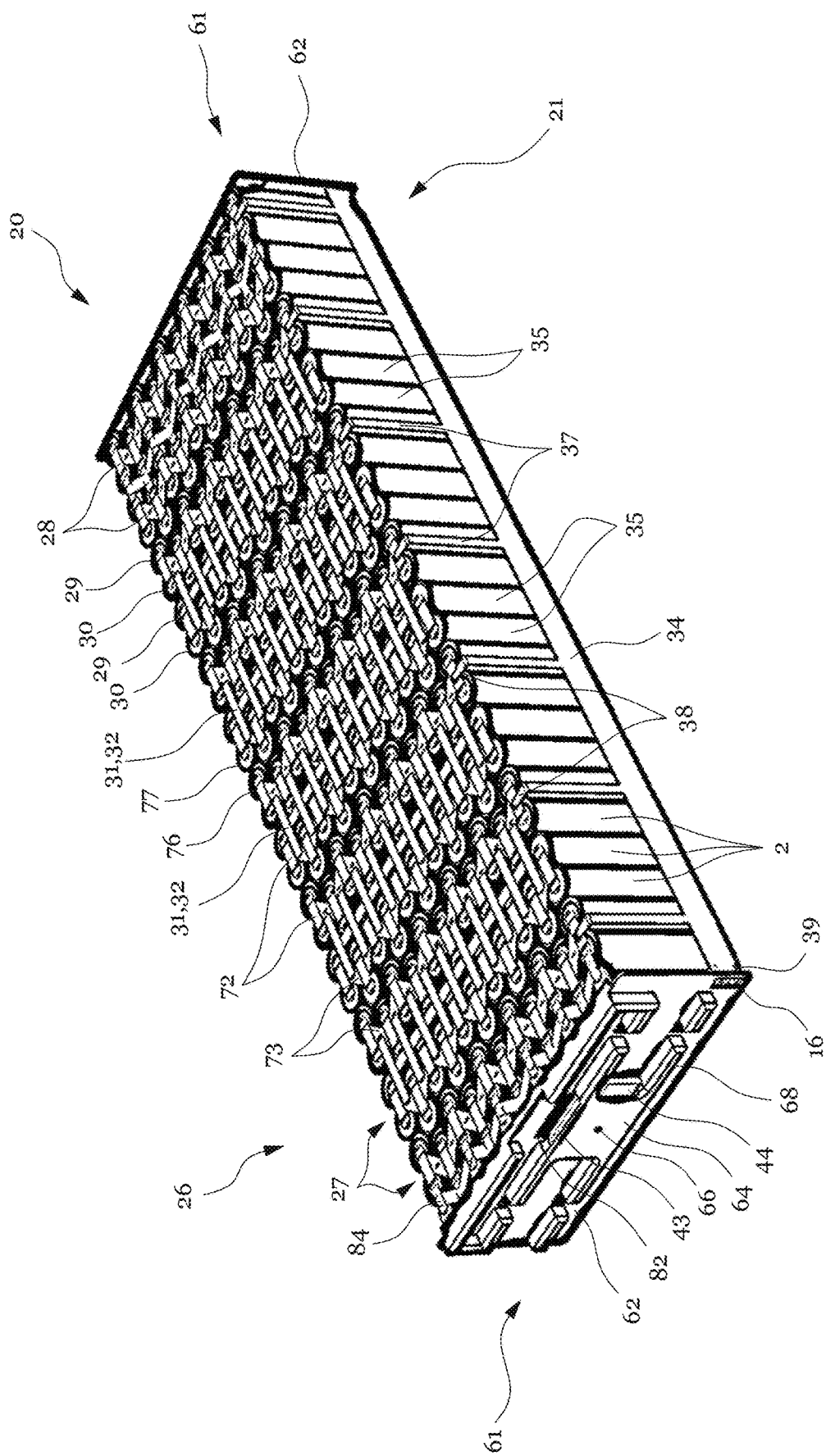

FIG. 12 shows a general view of the battery cell macromodule 26, whereby the housing shell 4 as well as the cover 11 are not shown for illustrative purposes. In particular, the plurality of series-connected micromodules 27 can be seen, as well as, in the lower region of the visible longitudinal side of the module, the circuit board 34 with arms 37 extending therefrom and the folded intermediate taps 38, each of which is in contact with contact plates 72 between pairs of battery cells 35, the tap being at every other pair of battery cells 35 along the longitudinal side.

The features disclosed in the foregoing description, figures and claims may be significant, both individually and in any combination, for the realization of the invention in the various embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. Battery cell macromodule housing for accommodating a plurality of cylindrical battery cells in an interior space of the battery cell, said macromodule housing comprising:
   a housing shell which comprises two longitudinal walls and two end walls, the longitudinal walls being arranged perpendicularly to the end walls, and the longitudinal walls and the end walls each lying opposite one another at a distance from one another in parallel, so that the walls enclose the interior space in an annular manner,
   the inner sides of the walls each having a plurality of positioning indentations which are each configured for positioning a battery cell perpendicular to the passage plane enclosed by the walls, the inner sides of the walls each having separating elements arranged between adjacent positioning indentations, which project into the interior space, the longitudinal walls being longer than the end walls and the positioning indentations in the end walls being at a greater distance from one another than the positioning indentations in the longitudinal walls,
   wherein the battery cell macromodule housing is closed at the upper side and/or the lower side of the housing shell by a covering, which comprises two superimposed plates, of which an outer plate is made of a material with a thermal conductivity capable of effectively dissipating heat from the micromodule interior to the outside and of which an inner plate is made of an electrically non-conductive material, wherein at least one of the plates has a plurality of pre-embossed predetermined fracture surfaces, each of which is arranged substantially in alignment with the longitudinal axes of the battery cells receivable in the housing, such that in the event of outgassing of one or more of the battery cells, escaping het gases can knock the predetermined fracture surfaces out of the plates.

2. Battery cell macromodule housing according to claim 1, wherein the two longitudinal walls each have the same even number of positioning indentations and the two end walls each have a number of positioning indentations differing from each other by a value of one.

3. Battery cell macromodule housing according to claim 2, wherein one of the end walls has at least three positioning indentations and the other end wall has one additional positioning indentation.

4. Battery cell macromodule housing according to claim 1, wherein the spacing of the positioning indentations in the end walls is greater than the spacing of the positioning indentations in the longitudinal walls by a factor of $2/\sqrt{3}$.

5. Battery cell macromodule housing according to claim 1, wherein the positioning indentations comprise half-shells having a radius of curvature corresponding to a radius of curvature of the cylindrical battery cells, the distance between the longitudinal half-shells being greater than twice the radius of curvature.

6. Battery cell macromodule housing according to claim 1, wherein the diameters of the predetermined fracture surfaces are smaller than the outer diameters of the battery cells.

7. Battery cell macromodule housing according to claim 1, wherein one of the longitudinal walls has a longitudinal groove in the longitudinal direction at the housing top or bottom side for receiving a printed circuit board, wherein, starting from the longitudinal groove, a plurality of through openings spaced apart from one another extend through the longitudinal wall parallel to the positioning indentations, in each case in alignment with one of the internal separating elements.

8. Battery cell macromodule housing according to claim 7, wherein those separating elements, that are aligned with one of the through-openings, each have grooves running perpendicular to the longitudinal wall plane on the upper and lower sides of the housing, wherein a first of the grooves in each case opens into the longitudinal groove and a second of the grooves in each case opens into respective through-opening.

9. Battery cell macromodule housing according to claim 7, wherein the longitudinal groove opens into one of the end walls and has a recess in the mouth region for receiving a circuit board connection socket.

10. Battery cell macromodule housing according to claim 7, comprising a circuit board arranged in the longitudinal groove and having a plurality of arms each extending through the through openings and electrically connected to the circuit board, wherein the circuit board further comprises intermediate taps bent on the upper side of the housing and on the lower side of the housing, which taps extend through the grooves extending perpendicularly to the longitudinal wall plane and are each in contact with electrical connecting elements between two battery cells adjacent to the grooves.

11. Battery cell macromodule housing according to claim 10, wherein the intermediate taps are welded onto the connecting elements.

12. Battery cell macromodule housing according to claim 10, wherein the intermediate taps each comprise at least one sensor for detecting temperature values and cell voltages.

13. The battery cell macromodule housing of claim 10, wherein the circuit board has a connector socket attached thereto and received in the face recess.

14. Battery cell macromodule housing according to claim 1, wherein one of the end walls has a recess forming a step on the outside on the housing top side and the other of the end walls has a recess forming a step on the outside on the housing bottom side.

15. Battery cell macromodule housing according to claim 14, wherein the recess extends over a first width of the end-face wall with a first depth as viewed from the housing top or bottom, the first width corresponding to the number of separating elements on the inner side of the end wall, the recess having, in a central region of the wall, a section of increased depth, the width of which corresponds substantially to the dimension of the increased depth.

16. Battery cell macromodule housing according to claim 14, wherein the separating elements adjacent to the recess each have recesses which are open towards the housing upper side and towards the housing lower side, respectively, and which each extend perpendicularly to the end wall planes.

17. Battery cell macromodule housing according to claim 16, wherein the recesses each have a rectangular shape in cross-section through the end walls, resulting in a castellated structure.

18. Battery cell macromodule housing according to claim 1, wherein a plurality of latching elements are arranged on the outer sides of the end walls in each case.

19. The battery cell macromodule housing of claim 18, wherein the latch members each have two parallel spaced latch hooks, each extending away from the end wall and each having an undercut latch portion, the latch portions facing away from each other.

20. Contacting device for a battery cell macromodule housing according to claim 1, which is configured for supplying voltage to the battery cells which can be accommodated in the housing, having a power connector which provides an electrical line between the housing interior and the housing exterior, and having a plug sleeve which is electrically and mechanically connected to the power connector, and having a power plug which can be detachably plugged into the plug sleeve, wherein the plug sleeve has a plurality of plug openings that allow the power plug to be inserted from a plurality of different directions, parallel to the end wall plane.

21. Contacting device according to claim 20, wherein the power connector has a contact rail aligned parallel to the end wall and having a width corresponding to the number of separating elements on the inner side of the associated end wall, wherein a contact lug adjoins the contact rail and wherein contact fingers bent at right angles extend away from the contact rail in the direction of the housing interior.

22. Contacting device according to claim 21, wherein one of the end walls of the battery cell macromodule housing has a recess forming a step on the outside on the housing top side and the other of the end walls has a recess forming a step on the outside on the housing bottom side, wherein the recess extends over a first width of the end-face wall with a first depth as viewed from the housing top or bottom, the first width corresponding to the number of separating elements on the inner side of the end wall, the recess having, in a central region of the wall, a section of increased depth, the width of which corresponds substantially to the dimension of the increased depth, wherein said power connector is inserted in said recess, wherein said contact rail is inserted in said first width section, wherein said contact lug extends into said increased depth section, and wherein said contact fingers extend through said recesses into said housing interior.

23. Contacting device according to claim 21, wherein the power connector comprises a melting fuse arranged between the contact lug and the contact rail and formed by a predefined number of webs each having a predefined width.

24. Housing cover according to claim 23, wherein a viewing window is arranged in the cover plate, which window is aligned with the melting fuse covered by the cover plate, so that the state of the melting fuse can be checked from the outside of the housing.

25. Contacting device according to claim 21, which can be coupled mechanically and electrically to battery cells accommodated in the housing by means of the contact fingers of the power connector, the plug sleeve being coupled mechanically and electrically to the contact lug.

26. Contacting device according to claim 20, wherein the plug sleeve has four openings, each of which is arranged at right angles to one another.

27. Contacting device according to claim 20, wherein the plug sleeve has a sleeve aperture spaced from the front housing wall, into which the power plug can resiliently engage.

28. Contacting device according to claim 20, wherein the power plug comprises a plug element with two plug plates extending parallel to each other, which are resiliently movable relative to each other and are connected to each other via a holding portion, wherein one of the plug plates has a clip aperture through which a clip portion of a clip received between the plug plates projects, the clip having a circumferential edge which engages behind the clip aperture so that the clip is prevented from slipping out through the clip aperture.

29. The contacting device of claim 28, wherein the dimensions of the sleeve aperture and clip portion are matched such that when the power plug is inserted into the plug sleeve, the clip engages the sleeve aperture.

30. Contacting device according to claim 28, wherein the upper side of the clip projecting through the sleeve aperture has a colored marking.

31. Housing cover of claim 30, wherein the roof structure includes a through hole through which the colored marking of the clip is visible when the power plug is properly inserted.

32. Housing cover for a contacting device according to claim 20 for end-face attachment to the housing, which can be attached to the housing shell to cover one or more of the end walls, wherein the housing cover has a cover plate which can be brought into contact with the end wall of the housing and has a through-opening with an outer diameter corresponding to the plug sleeve dimensions, so that the plug sleeve projects through the through-opening when the housing cover is attached.

33. Housing cover according to claim 32 further comprising a roof structure spaced from the cover plate and externally covering the plug sleeve and having roof openings corresponding to the openings in the plug sleeve, through which the power plug is insertable into the plug sleeve.

34. Housing cover according to claim 32, wherein the cover plate has an aperture which is aligned with a recess arranged in an end wall for receiving a printed circuit board connection socket.

35. Housing cover according to claim 34, wherein the housing cover has stiffening ribs which are each arranged on the cover plate but do not extend in regions of the cover plate running perpendicular to the aperture or in the region of the insertion axes of the power plug.

36. Battery cell macromodule,
comprising a plurality of battery cell micromodules accommodated in a battery cell macromodule housing according to claim 1, wherein each battery cell micromodule is formed of a plurality of cylindrical battery cells aligned parallel to each other, which are fixed to each other at a predefined distance and electrically contacted by a connecting plate welded to the upper sides and to the lower sides of the cells, respectively,
wherein each battery cell micromodule comprises a plurality of battery cell pairs each having two battery cells arranged in parallel side by side, wherein the battery cell pairs are arranged in a row extending parallel to the end walls in a zigzag manner in pairs offset from each other so that all directly adjacent battery cells of a battery cell micromodule have substantially the same distance from each other,
wherein the battery cell micromodules are arranged in parallel next to one another in the housing shell and the battery cells lying on the outside in each case bear against one of the positioning indentations of the end walls or the longitudinal walls,
the battery cell micromodules being fixed relative to one another in the passage plane via at least one fixing means, so that the distance between all directly adjacent battery cells of battery cell micromodules adjoining one another corresponds essentially to the battery cell spacing of the battery cell micromodules.

37. Battery cell macromodule according to claim 36, wherein said fixing means comprises electrically conductive micromodule connectors fixed on and connecting the tops and bottoms, respectively, of adjacent battery cell micromodules so that they are contacted and connected in series.

38. Battery cell macromodule according to claim 37, wherein said fixing means further comprises electrically non-conductive micromodule connectors fixed to said connecting plates which are not connected together in the course of series connection.

39. Battery cell macromodule according to claim 36, wherein said fixing means comprises a filling adhesive inserted between said battery cells in said housing shell.

* * * * *